United States Patent [19]

Church et al.

[11] 3,956,531

[45] *May 11, 1976

[54] CHROMIUM OXIDE DENSIFICATION, BONDING, HARDENING AND STRENGTHENING OF BODIES HAVING INTERCONNECTED POROSITY

[75] Inventors: Peter K. Church, Cascade; Oliver J. Knutson, Colorado Springs, both of Colo.

[73] Assignee: Kaman Sciences Corporation, Colorado Springs, Colo.

[ * ] Notice: The portion of the term of this patent subsequent to Mar. 16, 1993, has been disclaimed.

[22] Filed: Sept. 18, 1972

[21] Appl. No.: 290,153

Related U.S. Application Data

[60] Continuation-in-part of Ser. No. 642,704, June 1, 1967, abandoned, which is a continuation of Ser. Nos. 63,998, June 18, 1970, Pat. No. 3,734,767, and Ser. No. 694,303, Dec. 28, 1967, Pat. No. 3,789,096, and Ser. No. 7,948, Feb. 2, 1970, which is a division of Ser. No. 694,303.

[52] U.S. Cl. ............................... 427/226; 427/379; 427/380

[51] Int. Cl.² .............................................. B05D 3/02
[58] Field of Search ............ 117/169 R, 123 B, 127, 117/69, 62; 204/38 A; 427/226, 372, 379, 380

[56] References Cited
UNITED STATES PATENTS

| | | | |
|---|---|---|---|
| 2,987,417 | 6/1961 | Cochran | 117/69 |
| 2,989,418 | 6/1961 | Harbaugh | 117/62 |
| 3,299,325 | 1/1967 | Wagener et al. | 204/38 A |
| 3,717,497 | 2/1973 | Stradley et al. | 117/169 R |

*Primary Examiner*—Cameron K. Weiffenbach
*Attorney, Agent, or Firm*—Max L. Wymore

[57] ABSTRACT

Chromium oxide densification, bonding, hardening and strengthening of bodies having interconnecting porosity therein by impregnation with a chromium compound convertible to chromium oxide on heating, heating the impregnated body to convert the compound to chromium oxide and repeating the impregnation and heating steps. The body may be of any material composed of an oxide, has an oxide constituent or will form a well adhering oxide on its surface.

50 Claims, No Drawings

CHROMIUM OXIDE DENSIFICATION, BONDING, HARDENING AND STRENGTHENING OF BODIES HAVING INTERCONNECTED POROSITY

This application discloses and claims subject matter in common with and is a continuation-in-part of applicants' applications for Letters Patent Ser. No. 642,704, filed June 1, 1967, for "Ceramic Treating Process and Product Produced Thereby," now abandoned in favor of continuation application Ser. No. 063,998, filed June 18, 1970, now U.S. Pat. No. 3,734,767; Ser. No. 694,303, filed Dec. 28, 1967, for "Ceramic Treating Process and Product Produced Thereby" now U.S. Pat. No. 3,789,096; and Ser. No. 007,948, filed Feb. 2, 1970, as a division of Ser. No. 694,303.

Applicants' U.S. Pat. No. 3,734,767 is directed to the chromium oxide densification, hardening and strengthening of underfired, partially sintered or partially vitrified oxide bodies having interconnected porous structure. Applicants' U.S. Pat. No. 3,789,096 is directed to the chromium oxide densification, hardening, and strengthening of bodies formed by the chromium oxide or other bonding of oxides, mixtures of oxides, carbides, metals, and metal alloy powders. Applicants' application Ser. No. 007,948 is directed to chromium oxide bonded, densified, hardened and strengthened coatings utilizing oxides, mixtures of oxides, metals and metal alloy powders.

The basic method described in these earlier applications, and that employed in the present application, consists of repeated impregnation-cure cycles of a porous body with a soluble chromium compound which is convertible in situ by heat to a chromium oxide. The starting body or coatings must have interconnected porosity and may be initially formed by any bonding method such as bisque firing (sintering), cold welding, clay binders or other binder materials, or it may be produced by using a chromium compound "binder" that is converted by heat to form a chromium oxide initial bond between the constituent grains or materials selected for the basic body.

There is disclosed in this application the fact that a great variety of materials can be bonded, densified, strengthened and hardened by means of the chromium compound-to-chromium oxide, multiple impregnation-cure cycle method according to the present invention.

More specifically, we have found that virtually any material can be chrome oxide bonded provided: (1) it is either composed of an oxide, has an oxide constituent or will form a well adhering oxide on its surface; (2) it is not soluble nor adversely reactive to the chromium compound employed as the impregnant; (3) it is inherently stable to at least the minimum heat cure temperature to be employed when converting the soluble chromium compound to a chromium oxide.

It is therefore a principal object of the present invention to provide an improved method of forming and densifying, hardening, bonding and strengthening bodies of a wide variety of materials.

A further important object of the present invention is to provide improved chromium binder compounds for use in the improved process.

A still further object of the present invention is to provide an improved method of densifying, hardening and strengthening bodies which are bound by glassy bonded systems, are self-bonded, chemically bonded, cold pressed, oxide bonded or chromium oxide bonded.

Examples of materials which can be treated by the process of the present invention are many of the nitrides, carbides, silicides, borides, intermetallics, ferrites, metals and metal alloys, complex oxides and mixtures of any of these including mixtures with oxides. It is well known, for instance, that most metals form a very thin oxide layer on their surfaces when exposed to air. If not, such a layer will invariably be formed with the application of heat in an air or oxidizing atmosphere. The same holds true for silicon carbide, silicon nitride, boron carbide, molybdenum silicide, and the like where oxides of silicon, boron and so on are formed. In fact, most such materials are quite difficult to obtain without these thin protective oxide layers being present.

Included within the scope of this application are the so-called complex oxides. As used here, a complex oxide does not mean a mixture of discrete oxides but rather an identifiable chemical compound. Examples are "zircon" or zirconium silicate ($ZrSiO_4$ or $ZrO_2 \cdot SiO_2$), calcium titanate ($CaTiO_3$ or $CaO \cdot TiO_2$), magnesium stannate ($MgSnO_3$ or $MgO \cdot SnO_2$), cesium zirconate ($CeZrO_4$ or $CeO_2 \cdot ZrO_2$) etc. These materials, of course, act like oxides insofar as forming a chromium oxide bond according to the invention.

It should be pointed out that the use of basic porous bodies for this process is not limited to those formed from finely divided particulate grains or powders. Bodies may also be densified, hardened and strengthened, using this chromium oxide bonding process, that are composed of non-particulate materials. Examples are: sintered metal felts; glass or refractory fiber mats or insulation; woven glass, refractory or metal cloth; foamed structures; particulate bodies into which reinforcing wire, fiber strips, etc. have been incorporated. Any non-particulate materials selected must, of course, meet the requirements outlined earlier in order to provide for a strong chrome oxide bond and an ultimate hardness and strength increase during the multiple impregnation-cure cycle densification process.

The term soluble chromium binder compound, as used in this application is intended to mean any of a number of chromium impregnants or "binders" such as water solutions of: chromic anhydride ($CrO_3$), usually called chromic acid when mixed with water ($H_2CrO_4$); chromium chloride ($CrCl_3 \cdot xH_2O$); chromium nitrate [$Cr(NO_3)_3 \cdot 6H_2O$]; chromium acetate ($Cr(OAC)_3 \cdot 4H_2O$); chromium sulfate ($Cr_2(SO_4)_3 \cdot 15H_2O$); etc. Also included are a wide variety of dichromates and chromates such as zinc dichromate; magnesium chromate; and mixtures of chromates with chromic acid. A variety of more complex soluble chromium compounds is also included that can perhaps be best categorized by the generalized formula $xCrO_3 \cdot yCr_2O_3 \cdot zH_2O$ which are chromic chromate complexes as set forth in the Amercian Chemical Society Monograph Series on Chromium, Volume 1, entitled "Chemistry of Chromium and its Compounds," Marvin J. Udy, Reinhold Publishing Corporation, New York, New York, copyright 1956, page 292, wherein chromium is present both in a trivalent cationic state and in a hexavalent anionic state. These are normally prepared by reducing chromic acid with some other chemical such as tararic acid, carbon, formic acid and the like. A second method is to dissolve $Cr_2O_3$ or $Cr_2O_3 \cdot xH_2O$ or chromium hydroxide in chromic acid. There is a limit of about 12–15% Cr(III) from $Cr_2O_3$ that may be introduced in this later method due to the low solubility of $Cr_2O_3$. In some cases with these complex chromium compounds made using the first method of preparing impregnated there may not be a complete reaction. For example, a treatment of formic acid with chromic acid may result in some formate remaining. No quantative analyses have been performed and any remaining organic material will be oxidized and volitized at some point during the heat cure cycle used following each impregnation cycle of the porous body.

Some of these binders such as chromic acid are extremely wetting. Others, such as the complex chromium compounds ($xCrO_3 \cdot yCr_2O_3 \cdot zH_2O$) can be prepared so as to contain large concentrations of chromium ions in solution.

Others such as the chromates have been found useful for achieving high hardness values in a few impregnation-cure cycles. These are also useful for filling bodies having a relatively large pore size structure whereas use of a compound such as chromium acetate might require several impregnation-cure cycles before achieving a noticeable increase in hardness.

Only the acidified soluble chromium binder compounds have been found to produce extremely hard bodies having improved strength. The basic and neutral solutions made by dissolving chromium binder compounds such as ammonium dichromate, potassium chromate, and the like have not been found to produce any significant increase in hardness or strength. As a result these appear to be useful only for filling porosity and no bonding of the resultant oxide formed upon heating appears to be taking place within the porous body.

While many of these special chromium binders have been found to be very useful for specific applications or for forming initial bonds, the impregnant preferred for achieving maximum hardness and strength is invariably chromic acid. Chromic acid has a marked tendency to form polyacids such as di-chromic, tri-chromic acid, etc. This polymerization progresses with time as water is eliminated. We have found no noticeable differences as far as bonding, hardness and strength is concerned whether the acid in use is freshly mixed or is several months old. The term chromic acid as used in this disclosure therefore is also intended to include the polymerized forms that may exist in solution.

All of the chromium binder compounds are normally used in relatively concentrated form in order to achieve maximum chromium oxide bonding and densification. Dilute solutions may have a tendency to migrate toward the surface of a porous part causing a surface hardening condition. For certain applications, of course, this may be desirable. While in most cases water is used as the preferred solvent for the soluble chromium compounds, others may often be used, such as alcohols, like isopropyl, methyl and the like, N-N, di-methyl formide and the like.

Upon curing at a temperature preferably in excess of 600°F or higher these soluble chromium compounds will be converted to a chromium oxide. For example, with increasing temperature chromic acid ($H_2CrO_4$) will first lose its water and the chromium anhydride ($CrO_3$) that remains will then as the temperature is further raised begin to lose oxygen until at about 600°F and higher, will convert to chromium oxide of the refractory form ($Cr_2O_3$ or $Cr_2O_3 \cdot xH_2O$). The same situation exists for the partially reacted soluble, complex, chromic acid form ($x \cdot CrO_3 \cdot yCr_2O_3 \cdot zH_2O$) discussed earlier.

Chromium compounds such as the chlorides, sulfates, acetates, etc. will also convert to $Cr_2O_3$ by heating to a suitable temperature. The chromates all require a higher temperature to convert to the oxide form (that is to a chromite or a chromite plus $Cr_2O_3$) than does chromic acid by itself. For the purposes of this disclosure chromites are considered to be a chromium oxide.

Bodies having the required interconnected porosity for the multiple, impregnation-cure cycle, chromium oxide bonding and densification method of this invention may be formed by one of several methods. Keeping in mind that clear cut categories are hard to make, these include systems such as the following:

a. Glassy bonded systems where the constituent materials of the porous body have been bonded with the aid of a flux or glass forming material. These require heating of the part to a temperature high enough to form or begin to melt the glassy constituent. Most of the commercial grades of ceramic materials, including even the 90% grades of alumina can be considered to fall in this category of bonding. Nucleated bodies and 100% glass bodies can also be included in this group.

b. Self-bonded skeletal bodies suitable for our process can also be prepared by partially sintering or underfiring a formed part to a temperature high enough to begin to establish bonding essentially only at the points of contact of the material of which the body is composed. Self-bonded silicon carbide for example is made in this way. While this is similar to the glassy bonded method, the term self-bonded is generally reserved for and is intended in this application to apply to relatively pure materials when a glass forming material such as clay, sodium oxide, etc. has not been added. The sintering temperature (and also pressure in the case of hot pressed bodies) will determine the extent of bonding and the amount of interconnected porosity in the body. This method is also intended to apply to the formation of porous, sintered metal bodies and parts.

c. Chemically bonded systems where the bond is established by means of an added bonding agent. Examples of bonding agents are sodium silicate, mono-aluminum phosphate, a silica such as DuPont Ludox, etc. Some type of heat is usually required to cure these binders but the process cannot be called sintering in the usual sense of ceramic art.

d. Cold pressed bodies where self-bonding is also the primary bonding mechanism. An example is the pressing of certain metal powders, such as aluminum, copper, titanium, cobalt and the like, where the forcing of the materials into close contact will cause a cold welding action to occur between the pieces or particles. Some refractory grains and other materials such as aluminum oxide and the like will also cold press into a very well knit body due to the interlocking action of the particulate structure. A few of these have been found to have sufficient "green" strength without sintering to be subsequently processed by our method without difficulty during the initial impregnation-cure cycle(s).

e. Oxide bonded bodies where the bonding is accomplished between the constituent materials by means of a natural oxide that forms during a heating cycle. An example is a part or body pressed or slip cast from boron carbide powder. During heating in an air or oxidizing atmosphere boron oxide will form on the grains creating a porous but bonded structure. Another example is a body bonded by means of special silicone binders where a silicon oxide type bond is formed at low temperature.

f. Chromium oxide bonding, a special case of (e) above, is disclosed and claimed in our prior applications Ser. No. 694,303 and Ser. No. 7,948 as well as the present application. Here the initial bonding of the formed body is established by the use of a chromium compound which is converted to a chromium oxide by a heat cure cycle. This method of bonding is often less expensive and/or more convenient than other methods, especially when considering that the same processing equipment and cycles can normally be used for establishing the initial bond as will be employed subsequently in the densification, hardening and strengthening of the body.

It can be seen that the actual method of forming and bonding the initial body is not critical so long as the bonding is not destroyed by the soluble chromium based impregnant to be used during subsequent processing reacting therewith and providing the body has suitable interconnected porosity to allow adequate penetration of the impregnant. The bond must, of course, also be enough to maintain the integrity of the body to at least the temperature employed to convert the chromium heat compound impregnant to a chromium oxide form. The following sections cover bodies and coatings densified, hardened and strengthened by means of acidic chromium binder impregnants according to a preferred method of the invention.

1. Chromium Oxide Processing of Preformed Porous Bodies

Some chromium oxide densification test results using porous, self-bonded silicon nitride ($Si_3N_4$) rods, ¼inch dia. × 5 inches long are shown in Table I. These were pressure impregnated using a concentrated (~1.7 specific gravity) solution of chromic acid ($CrO_3$ dissolved in $H_2O$) as the impregnating solution.

TABLE I

MEASURED HARDNESS VALUES FOR $Si_3N_4$ TEST RODS AFTER THIRTEEN IMPREGNATION CURE CYCLES USING CHROMIC ACID

| Bar No. | Hardness Rockwell 15N |
|---|---|
| 2 | 96.95 |
| 3 | 97.0 |
| 4 | 94.9 |
| 6 | 94.5 |
| 7 | 96.7 |
| 8 | 95.3 |
| 10 | 94.6 |
| 11 | 96.1 |

NOTE:
(1) Bars could not be measured on 15N Rockwell scale prior to processing due to readings below scale.
(2) The chromic acid impregnant had a specific gravity of ~1.7
(3) Test bars were ¼″ diameter × 5″ long After a thorough impregnation, the bars were heated starting at a temperature of 350°F and limited to a maximum of 1250°F. The entire heating cycle taking approximately 1 hour. This is a sufficient range to convert the chromic acid to a refractory chromium oxide $Cr_2O_3$ or $Cr_2O_3 \cdot xH_2O$). These impregnation-cure cycles were repeated for a total of 13 times in order to achieve the hardness values shown. The specifics of the impregnation-cure cycle method used is that identified as Method A as follows:

Method A a. Impregnating solution:
   soluble chromium solution as specified b. Solution temperature:
   ambient (room temperature)

c. Impregnation cycle:
   10 min. under solution at 95 psig
   20 min. under solution at 0 psig (ambient pressure)
   10 min. under solution at 95 psig
   20 min. under solution at 0 psig (ambient pressure)
   remove part from solution
   remove excess solution from part d. Cure cycle:
   20 min. at 350°F
   20 min. at 850°F
   20 min. at 1250°F
   60 min. cool down from 1250°F to room temperature e. Number of impregnation-cure cycles:
   as specified These silicon nitride rods were so porous prior to densification that it was impossible to measure the hardness on the 15N-Rockwell scale. The hardness values after the chromium oxide densification were 94–97 on the 15-N scale, being in fact, about as high as might be expected for a hot pressed $Si_3N_4$ body.

A maximum of 1250°F was used for the cure cycle as being sufficiently high to achieve a rapid conversion of the impregnant to chromium oxide.

Table II shows the results of a comparison set of test bars made from recrystallized silicon carbide material. As in the case of the silicon nitride bars just described, there were also ~¼ inch diameter × 5 inches long, had a fine interconnected porosity throughout and were processed in the same manner. The hardness determined on the Rockwell 15N scale prior to the $Cr_2O_3$ densification process was ~15N-70. After processing, the hardness values can be seen to have reached extremely high values, namely 15N-97 to 98.

Samples of both the densified silicon nitride and the silicon carbide bars described above were subsequently run in a sophisticated thermal shock test rig at temperatures alternately cycling between a 2500°F oxyacetylene flame and a room temperature air blast alternating at 3 minute intervals. After 1000 such cycles neither the SiC nor the $Si_3N_4$ chrome oxide processed bars had cracked. In addition they showed no decrease in their modulus of rupture strength data as compared to nonthermal cycled control specimens.

TABLE II

MEASURED HARDNESS VALUES FOR SiC TEST RODS AFTER THIRTEEN IMPREGNATION CURE CYLES USING CHROMIC ACID

| Bar No. | Hardness Rockwell 15N |
|---|---|
| A-1 | 98.4 |
| A-2 | 96.6 |
| A-3 | 97.6 |
| A-4 | 97.8 |
| A-6 | 97.5 |
| A-7 | 97.5 |
| A-8 | 97.8 |
| A-9 | 97.3 |
| A-10 | 97.1 |

NOTE:
(1) One sample checked on 45N scale = 45N-85
(2) Pre-treatment hardness ≈ 15N-70
(3) The chromic acid impregnant had a specific gravity of ~1.7
(4) Test bars measured ¼″ diameter × 5″ long A large number of additional tests have been made using a variety of porous silicon carbide materials. These include self-bonded, oxide bonded and glassy bonded silicon carbides and even materials made by converting carbon to silicon carbide by chemical-thermal conversion means. In nearly every case, a marked increase in hardness and/or strength has been observed. Table III lists a representative group of these materials that were subsequently measured for hardness and flexural strength (modulus of rupture). The Dow Corning bars, identified as DC, were ¼ inch diameter × 5 inches long while all the others were ~¼ inch × ¼ inch × 4 inches in length.

In Table III, C-1.7 stands for chromic acid impregnant having a specific gravity of about 1.7; MC-1 stands for a magnesium chromate solution adjusted to a specific gravity of about 1.30. MC-2 stands for a magnesium di-chromate solution with a specific gravity also about 1.7. ZC-8 is a zinc chromate solution with excess chromic acid also adjusted to a specific gravity of about 1.7. The identity and proportions of metal oxide to chromium trioxide is solution can be more readily seen for each of these chromates by referring to Table IV which lists the chromium binder composition. Samples DC-1 through DC-5, C-1 through C-5 and E-17 through E-24 were processed with the chromic acid binder C-1.7 as the impregnant for all cycles.

Samples DC-8 and C-8 used MC-1 as the impregnant for all thirteen cycles. Similarly Samples E-11 through E-16 used MC-2 as the impregnant for all cycles. Results in all cases using the magnesium chromate or di-chromate solutions showed lower flexural strength and hardness than with the chromic acid impregnation method for all cycles.

TABLE III

SILICON CARBIDE TEST BARS SHOWING HARDNESS AND STRENGTH INCREASE AS A FUNCTION OF CHROME OXIDE DENSIFICATION CYCLES

| Sample No. | Material | Impregnation Liquid | Number Cure Cycles | Maximum Cure Temperature | Measured Specific Gravity | Rockwell 15N | Hardness 45N | Flexural Strength | Remarks |
|---|---|---|---|---|---|---|---|---|---|
| DC-0 | Dow Corning Oxide Bonded SiC | None | None | None | 2.336 | 51.6 | — | 7,030 psi | |
| DC-1 | " | C-1.7 | 7× | 1250°F* | — | 86.9 | — | 21,896 psi | |
| DC-2 | " | " | 9× | " | 3.120 | 83.2 | — | 20,127 psi | |
| DC-3 | " | " | 11× | " | — | 80.8 | — | 20,827 psi | |
| DC-4 | " | " | 13× | " | — | 89.7 | — | 20,925 psi | |
| DC-5 | " | " | 15× | " | 3.299 | 94.9 | — | 25,427 psi | |
| DC-8 | " | MC-1 | 13× | " | — | 68.3 | — | 10,000 psi | |
| C-0 | Corning Glass Works Self-Bonded SiC | C-1.7 | None | None | — | too soft to measure | too soft to measure | 1,902 psi | |
| C-1 | " | " | 7× | 1250°F | — | 91.9 | 61.0 | 12,089 psi | |
| C-2 | " | " | 9× | " | — | 93.0 | 63.5 | 12,027 psi | |
| C-3 | " | " | 11× | " | — | 94.8 | 70.1 | 15,538 psi | |
| C-4 | " | " | 13× | " | — | 95.4 | 60.3 | 14,110 psi | |
| C-5 | Corning Glass Works Self-Bonded SiC | C-1.7 | 15× | 1250°F | — | 94.5 | 80.0 | 15,726 psi | |
| C-8 | " | MC-1 | 13× | " | — | 83.7 | 31.9 | 6,776 psi | |
| E-32 E-35 | Norton Lot No. 2 Self-Bonded SiC | None | None | — | 2.67 | 88.0 | — | 17,799 psi | |
| E-17 E-18 | " | C-1.7 | (7×) | 1250°F* | 3.97 | 95.4 | — | 14,941 psi | |
| E-19 E-20 | " | " | 10× | " | 3.06 | 97.5 | — | 21,710 psi | |
| E-21 E-22 | " | " | 13× | " | 3.15 | 98.0 | — | 20,207 psi | |
| E-23 E-24 | " | " | 13× | 1100°F | 3.15 | 79.0 | — | 23,877 psi | |
| E-11 E-12 | " | MC-2 | (7×) | 1250°F | 2.98 | 87.7 | — | 14,734 psi | |
| E-13 E-14 | " | " | (10×) | | 2.96 | 93.0 | — | 14,968 psi | |
| E-15 E-16 | " | " | (13×) | | 2.97 | 94.8 | — | 19,289 psi | |
| A-1 A-5 | Norton Lot No. 3 Self-Bonded SiC | None | None | — | 2.741 | 82.4 | — | 11,477 psi | |
| A-6 A-7 | " | C-1.7 | 13× | 1500°F* | 3.081 | 92.0 | — | 24,241 psi | |
| A-8 A-9 | Norton Lot No. 3 Self-Bonded SiC | C-1.7 | 13× | 1500°F* | 3.104 | 93.0 | — | 30,932 psi | HF etched prior to processing |
| A-10 A-11 | " | " | 13× | " | 3.073 | 92.0 | — | 34,657 psi | Oxidized 1150°F 20 minutes prior to processing |
| A-12 A-13 | " | " | 13× | " | 3.117 | 92.8 | — | 32,901 psi | Immersed in 150°F C-1.7 solution 10 minutes prior to processing |
| G-32 | Dow Corning Oxide Bonded SiC | None | None | None | 2.27 | too soft to measure | too soft to measure | 9,886 psi | |
| G-33 | " | C-1.7 | 13× | 1250°F | 3.00 | 88.9 | 72.6 | 15,158 psi | |

TABLE III-continued
SILICON CARBIDE TEST BARS SHOWING HARDNESS AND STRENGTH INCREASE AS A FUNCTION OF CHROME OXIDE DENSIFICATION CYCLES

| Sample No. | Material | Impregnation Liquid | Number Cure Cycles | Maximum Cure Temperature | Measured Specific Gravity | Rockwell Hardness 15N | Hardness 45N | Flexural Strength | Remarks |
|---|---|---|---|---|---|---|---|---|---|
| G-34 | " | ZC-8+C-1.7 | (1×)+(12×) | " | 2.89 | 91.0 | 70.2 | 18,129 psi | |

*2000°F cure temperature used on last impregnation-cure cycle only
**2300°F cure temperature used on last impregnation-cure cycle only The following Table shows the various impregnating liquids, binders and mixing liquids specified in the disclosure along with their generalized description and formula. A brief description of their preparation method and specific gravity is also listed. Note that there may be alternate ways of preparing some of the solutions shown.

chromate-chromic acid solution impregnations has often shown improved hardness and/or strength over that of chromic acid alone as the impregnant for all cycles. In other cases, it has not. It is believed that the initial pore sizes of the body may play an important part as to the optimum impregnant system. All of the samples in Table III were processed using the pressure

TABLE IV

| Symbol | Description | Formula | Materials For Preparation | Parts by Weight Additive | Preparation Procedure | Specific Gravity |
|---|---|---|---|---|---|---|
| C-1.65 | Chromic Acid | $H_2CrO_4$ | Chromium Trioxide $(CrO_3)$ | — | Dissolve in $H_2O$ | 1.65 |
| C-1.7 | Chromic Acid | $H_2CrO_4$ | Chromium Trioxide $(CrO_3)$ | — | Dissolve in $H_2O$ adding excess $CrO_3$. Let stand for about one day or more while the chromic acid solution polymerizes - add additional $H_2O$ if required to adjust specific gravity | 1.7 |
| CRC-2 | Soluble complex chromium compound | $xCrO_3 \cdot y Cr_2O_3 \cdot 3 H_2O$ | Carbon (C) Chromium trioxide $(CrO_3)$ | ≈9 ≈240 | Add $CrO_3$ to $H_2O$ to make a concentrated solution. Then slowly add the carbon and stir. Reaction may require heat to get started. Let stand until reaction stops. | 1.7 |
| C-7 | " | " | Chromium Oxide $(Cr_2O_3$ or $Cr_2O_3 \cdot xH_2O)$ Chromium Trioxide | ≈210 ≈1812 | Add $CrO_3$ to $H_2O$ to make a concentrated solution. Heat solution to about 80°C and slowly add $Cr_2O_3$ (Pigment grade) until dissolved | 1.84 |
| CC-1 | Chromium Chloride | $CrCl_3 \cdot 10H_2O$ | Chromium Chloride $(CrCl_3)$ | | Dissolve $CrCl_3$ in $H_2O$ | 1.3 |
| MC-1 | Magnesium Chromate | $MgCrO_4$ | Magnesium Oxide (MgO) Chromium Trioxide $(CrO_3)$ | ≈40.3 ≈100 | Add $CrO_3$ to $H_2O$ to make a concentrated solution. Then add MgO slowly until dissolved | 1.3 |
| MC-2 | Magnesium Dichromate | $MgCr_2O_7$ | Magnesium Oxide (MgO) Chromium Trioxide $(CrO_3)$ | ≈40.3 ≈200 | " | 1.65 |
| MC-4 | Magnesium Chromate Chromic Acid Mixture | $MgCrO_4$+ $xCrO_3$ | " | ≈40.3 ≈400 | " | 1.65 |
| MC-6 | " | " | " | ≈40.3 ≈600 | " | 1.65 |
| MC-10 | " | " | " | ≈40.3 ≈1000 | " | 1.65 |
| ZC-2 | Zinc Dichromate | $ZnCr_2O_7$ | Zinc Oxide (ZnO) Chromium Trioxide $(CrO_3)$ | ≈40.7 ≈200 | Add $CrO_3$ to $H_2O$ to make a concentrated solution. Then add ZnO slowly until dissolved | 1.65 |
| ZC-4 | Zinc Chromate Chromic Acid Mixture | $ZnCrO_4$+ $xCrO_3$ | " | ≈40.7 ≈400 | | 1.65 |
| ZC-8 | " | " | " | ≈40.7 ≈800 | | 1.65 |
| ZC-10 | " | " | " | ≈40.7 ≈1000 | | 1.65 |

In Sample G-34, ZC-8 (zinc chromate-chromic acid) solution was used only as the impregnant for the initial impregnation-cure cycle and was then followed by straight chromic acid for the remaining twelve impregnation-cure cycles. This showed a slight improvement in flexural strength over Sample G-33 where chromic acid was used as the impregnant for all 13 cycles. In other tests, the use of one or two initial chromate or chromate-chromic acid solution impregnations has often shown improved hardness and/or strength over that of chromic acid alone as the impregnant for all impregnation and thermal cycle system called Method A except tests G-32, G-33 and G-34 which used Method B. The processing details for Method B are as follows:

Method B a. Impregnating solution:
   soluble chromium solution as specified b. Solution temperature:
   ambient (room temperature)
c. Impregnation cycle:
   10 min. under solution at 95 psig This, coupled with the probability that there is more silicon oxide present on the silicon carbide grains of the low-fired material, may account for the improved results.

TABLE V

Comparisons between low and high fired, Norton self-bonded silicon carbide after $Cr_2O_3$ densification treatment

| Sample No. | Material | Impregnation Liquid | Number Cure cycles | Maximum Cure Temperature | Measured Specific Gravity | Rockwell Hardness 15N | Rockwell Hardness 45N | Flexural Strength | Remarks |
|---|---|---|---|---|---|---|---|---|---|
| L-0 | Low Fired | | | | | | | | |
| L-1 | Norton Self-Bonded | None | NOne | 1500°F | Not Measured | Not Measured | | 16,177 psi 13,724 psi | |
| L-10 | " | | | | | | | 25,443 psi | |
| L-11 | " | C-1.7 | 13× | " | " | " | | 21,596 psi | |
| H-1 | High Fired | | | | | | | 15,098 psi | |
| H-2 | Norton Self-Bonded | None | NOne | " | " | " | | 14,923 psi | |
| H-10 | " | | | | | | | 17,460 psi | |
| H-11 | " | C-1.7 | 13× | " | " | " | | 18,145 psi | |

NOTE:
(1) Test bars were ≈5/16" × 5/16' × 5" long
(2) Processing by method B using a chromic acid impregnant with specific gravity ≈1.7 (C-1.7)

20 min. under solution at 0 psig (ambient pressure)
10 min. under solution at 95 psig
20 min. under solution at 0 psig (ambient pressure)
remove part from solution and
remove excess solution from part d. Cure cycle:
   20 min. at 350°F
   20 min. at 500°F
   20 min. at 850°F
   20 min. at 1250°F
   60 min. cool down from 1250°F to room temperature
   remove any excess oxide build-up on parts after each cure cycle e. Number of impregnation-cure cycles:
   as specified Table V covers some comparative strength measurements made with silicon carbide manufactured by the Norton Company. One group of bars was made by the more normal "high-fired" self-bonding process in which noticeable recrystallization occurs. These bars are very similar to the Norton bars covered in Table III and which displayed somewhat erratic strength data upon densification as compared to the Dow Corning or Corning Glass Works material. The other group of samples in Table V used "low-fired" silicon carbide material. As can be seen from the data, the increase in strength between the densified versus non-densified bars in the low-fired group is very marked. This test also shows that the $Cr_2O_3$ densification of the low-fired material provides substantially higher strength than for the high-fired material. The low-fired bars had a very fine and uniform grain structure compared to the high-fired ones and showed no obvious recrystallization.

Table VI shows test results for some silicon carbide coated graphite rods in which the carbide coating has been densified with the multiple chromic acid impregnation-cure cycle method of this invention in comparison with non-treated rods. Again, the $Cr_2O_3$ densification provides a substantial increase in strength.

A variety of silicon carbide parts including hollow-core seal rings and turbine blades and even glassy bonded abrasive hones have been densified by the multiple impregnation-cure method of this invention. Again, the bonding and densification that results between the chromium oxide and the silicon carbide provides a very noticeable increase in hardness and strength as well as an associated increase in modulus of elasticity and compressive strength.

A number of different glass and silica based bodies having interconnected porosity have also been chromium oxide densified by means of our process. Among these are such materials as Corning Glass Works Vicor Foam (a high purity vitrified silica with very fine interconnected porosity), and Glassrock, a commercially available slip cast fused porous silica. These materials have shown a definite increase in hardness and strength after chromium oxide densification.

Table VII shows test results for two porosity grades of Cercor (a Corning Glass Works' complex oxide product of lithium aluminum silicate and/or magnesium aluminum silicate) and one sample of Corning porous fused silica. The two 9456 Cercor samples (No. 9 and No. 10) were originally fired at different temperatures making their pore structure somewhat different from each other. Processing was done in accordance with Method B as set forth above.

TABLE VI

Hardness and strength measurements for $Cr_2O_3$ processed Dow Corning silicon carbide coated graphite rods

| Sample No. | Material | Impregnation Liquid | Number Cure Cycles | Maximum Cure Temperature | Measured Specific Gravity | Rockwell Hardness | Flexural Strength | Remarks |
|---|---|---|---|---|---|---|---|---|
| c | Dow Corning SiC coated graphite | None | None | — | 1.910 | 15N-23.2 | 8,845 psi | |
| a | " | C-1.7 | (13×) | 1250°F | | 15N-74.9 | 13,827 psi | |

NOTE:
(1) Test rods were ¼" in diameter × 6" long
(2) Processing per method B using ≈1.7 specific gravity chromic acid (C-1.7) where specified above

TABLE VII

Some porous Cercor and fused silica bodies densified with $Cr_2O_3$

| Sample No. | Corning Description | Pretreatment Rockwell Hardness | Hardness vs. C-1.7 impregnation-cure cycles | | | | |
|---|---|---|---|---|---|---|---|
| | | | 5× | 7× | 9× | 11× | 13× |
| 10 | Cercor type 9456* | 15N-84.2 | 94.2 | 94.4 | 94.7 | 95.3 | 95.4 |
| 9 | Cercor type 9456* | 15N-91.8 | 93.1 | 93.6 | 93.8 | 93.6 | 93.7 |
| 3 | Type 7941 Fused silica* | 15N-80.3 | 86.0 | 92.9 | 94.7 | 95.2 | 95.2 |

*Products of Corning Glass Works, Corning, New York
NOTE:
(1) Sample size above ⅜" × ½" × 4"
(2) See impregnant description (C-1.7) TAble IV
(3) Parts processed using method B Table VIII shows flexural strength measurements for Corning Cercor type 9455 lithium alumina silicate densified in the same manner as the Cercor 9456 samples of Table VII. The average strength in these tests was shown to slightly more than double due to the chromium oxide densification and bonding process.

Table IX shows some compressive strength measurements made with chrome oxide densified Cercor, lithium alumina silicate formed into a thin walled, honeycomb, heat exchanger material. In this case, only the thin inherently porous Cercor walls of the honeycomb were densified. The excess chromic acid was carefully removed from the gas-flow passageways through the honeycomb structure after each impregnation cycle to prevent the possibility of closing up any of the intended honeycomb openings. As can be seen, densifying the Cercor material forming the thin walls of the honeycomb structure greatly improves the compressive strength. The impregnation-cure cycles were per Method B, and again C-1.7 listed as the impregnant signifies a chromic acid solution with a specific gravity of ~1.7. More recent test results have also shown a considerable improvement in wear resistance of such chromium oxide densified heat exchangers when sliding against the seals used in turbine engine test rigs at elevated temperatures.

Additional work has been done with heat exchangers made from a natural, mined form of lithium aluminum silicate known as petalite. THe strength increase results are quite comparable to the Cercor material just described. The structure of the petalite honeycombs used is also inherently porous and readily accepts the chromic acid or other soluble chromium compound impregnant.

TABLE IX

Increase in compressive strength by $Cr_2O_3$ processing of Cercor turbine engine heat exchanger honeycomb material

| Sample No. | Impregnation Liquid | Number Cure Cycles | Maximum Cure Temperature | Compressive Strength | Remarks |
|---|---|---|---|---|---|
| 0 | None | None | — | 4,900 psi | |
| 3 | C-1.7 | 3× | 1250°F | 8,300 psi | |
| 6 | " | 6× | " | 10,500 psi | |
| 9 | " | 9× | " | 12,600 psi | |
| 12 | " | 12× | " | 12,900 psi | |

NOTE:
(1) Size of samples were 1 ¼" × 1 ¼" × 1 ¼" and were crushed in a direction parallel with the honeycomb openings
(2) Cercor is a registered trademark of Corning Glass Works, Corning, New York
(3) Processing by means of method B
(4) C-1.7 impregnant is chromic acid adjusted to a specific gravity of 1.7

Very recent test results have shown significant wear resistance to turbine engine seal materials at elevated temperatures with even a very few impregnation-cure cycles with the chromium oxide densification method.

Sintered metal structures having interconnected porosity have been successfully densified, bonded, hardened and strengthened using the process of this invention. Table X covers such as example using three grades of a porous sintered nickel material. This table shows the buckling strength, hardness, modulus rupture (flexural strength) and compressive strengths measured for non-densified versus chromium oxide densified samples. The increase in all of these listed properties due to the densification process is very significant. Again, the densification process of this invention evidences its ability to form strong oxide type bonds, this time with a metal skeletal structure. As explained earlier, it is believed that the bond is established between the chromium oxide and the thin nickel layer that forms on the nickel metal structure. Processing was by Method B with a chromic acid solution having a spe-

TABLE VIII

Flexural strength comparisons for $Cr_2O_3$ densified & non-densified Cercor test bars

| Sample No. | Designation | Impregnation Liquid | Number Cure Cycles | Maximum Cure Temperature | Measured Specific Gravity | Flexural Strength | Total |
|---|---|---|---|---|---|---|---|
| A-5 | Type 9455 Cercor | None | 13× | 1250°F | 2.095 | 3,550 psi | |
| A-6 | " | " | " | " | 2.075 | 6,220 psi | |
| A-7 | " | " | " | " | 2.070 | 5,760 psi | |
| A-8 | " | " | " | " | 2.087 | 4,440 psi | 1,990 psi |
| A-1 | " | C-1.7 | " | " | 2.516 | 11,120 psi | |
| A-2 | " | " | " | " | 2.507 | 10,450 psi | |
| A-3 | " | " | " | " | 2.492 | 10,650 psi | |
| A-4 | " | " | " | " | 2.501 | 9,770 psi | 10,500 psi |

NOTE:
(1) Cercor is a trade name of Corning Glass Works, Corning, New York
(2) Size of samples were 3/16" × 3/8" × ~2" long
(3) Parts were processed using method B
(4) C-1.7 impregnant is chromic acid adjusted to a specific gravity of 1.7 cific gravity of the order of 1.7 and a maximum cure temperature of 1250°F for each cycle.

Table XI shows the same general type of measurements just described for porous nickel samples of Table X but using instead a porous sintered iron material. Here the processing used was Method A, and C-1.7 as the chromic acid impregnant. Again, it can be seen that some unusual properties for a metal ceramic bonded composite does result. Very little change in the tensile properties occurs while those related to compressive strength are considerably enhanced over that of the porous metal structure prior to the chromium oxide processing. Values for commercial, non-heat treated 1020 steel are included for reference purposes only.

age of 55.0 on the Rockwell 15T scale. The non-densified bushings averaged a hardness value of 15T-12. The weight of a single bushing increased from 10.38g to 11.35g after the nine cycles.

A sheet of sintered stainless steel felt material about ⅛ inch thick × 3 inches × 1½ inches was processed in accordance with Method B using 1.65 specific gravity chromic acid. Aside from the very noticeable increase in stiffness and elastic modulus and decrease in porosity, the Rockwell hardness increased from an average reading of 15T-6 prior to processing to 15T-82.5 after thirteen impregnation-heat cure cycles.

A hot pressed boron carbide cylinder about one-half inch in diameter by about 2 inches in length was ob-

TABLE X

Sintered porous nickel with and without $Cr_2O_3$ densification and bonding

| Sample No. | Material | Impregnation Liquid | Number Cure Cycles | Maximum Cure Temperature | Rockwell Hardness | Buckling Strength | MOR (psi) | Compressive Strength |
|---|---|---|---|---|---|---|---|---|
| 6-1 | 6 micron porous nickel | None | None | None | 15T-<0 | very low | 4,927 | 1,250 psi |
| 6-2 | " | " | " | " | " | " | 5,000 | 1,200 psi |
| 6-3 | " | C-1.7 | 13× | 1250°F | not measured | 2290 | 7,350 | |
| 6-4 | " | " | " | " | " | 2665 | 16,300 | |
| 10-1 | 10 micron porous nickel | None | None | None | 15T-<0 | very low | 10,000 | 2,500 psi |
| 10-2 | " | " | " | " | " | " | 9,050 | 2,550 psi |
| 10-3 | " | C-1.7 | 13× | 1250°F | not measured | 3120 | 26,290 | 3,430 psi |
| 10-4 | " | " | " | " | " | 3290 | 25,630 | 3,260 psi |
| 20-1 | 20 micron porous nickel | None | None | None | 15T-<0 | very low | 8,350 | 2,500 psi |
| 20-2 | " | " | " | " | 15T-<0 | " | 7,390 | 2,500 psi |
| 20-3 | " | C-1.7 | 13× | 1250°F | not measured | 2500 | 20,260 | 2,600 psi |
| 20-4 | " | " | " | " | " | 2535 | 21,072 | 2,420 psi |

NOTE:
(1) Bar size was ¼" × ¼" × ¼"
(2) This material was produced by Corning Glass Works, Corning, New York
(3) Processing by means of method B
(4) C-1.7 impregnant is chromic acid adjusted to a specific gravity of 1.7

TABLE XI

Sintered porous iron with and without $Cr_2O_3$ densification and bonding

| Physical Measurement | Sintered Iron (as received) | $Cr_2O_3$ Densified Sintered Iron | C-1020 Steel (comparison only) |
|---|---|---|---|
| Hardness (Rockwell) | A-48 | A-74 (~C-47) | A-65 (~C-29) |
| Compressive Strength (½" × ¼" × ¼" bar) | Starts yielding- 80,000 psi Failed-179,200 psi | No yielding until failure. Failed- 160,000 psi | Starts yielding- 41,600 psi Failed-160,000 psi |
| Buckling Strength 1½" × ¼" × ¼" bar | 51,200 psi | 75,200 psi | No test |
| Rupture Strength 2" gage length ¼" × ¼" × 3" bar | 59,570 psi | 63,360 psi | No failure |
| Tensile Strength | 29,000 psi | 30,000 psi | 68,000 psi |
| Modulus of Elasticity | $15 \times 10^6$ psi | $21 \times 10^6$ psi | $30 \times 10^6$ psi |
| Impact Strength (Izod) | Below scale (very poor) | Below scale (very poor) | 32 ft-lbs. |

NOTE:
(1) Because of non-standard sample sizes, many of above values should be used for comparison purposes only and not as absolute values
(2) Sintered material made by Federal Mogul Corp.
(3) Processing by means of method A with 1250°F maximum cure temperature
(4) Impregnant used was C-1.7, chromic acid at 1.7 specific gravity Some porous bronze bushings have been densified with 1.65 specific gravity chromic acid solution. So as not to noticeably oxidize the bronze alloy, the maximum cure temperature was limited to 900°F. Except for the change in curing temperature, Method B was used as the processing method. After nine impregnation-cure cycles, the hardness of the parts read an avertained for chromium oxide processing. This part had a density of 79–81%. During hot pressing the sintering temperature, in combination with the forming pressure, was low enough to obtain some interconnected porosity. Processing was accomplished using chromic acid (~1.65 s.g) using Method B except that the the maximum cure temperature was limited to 750°–800°F due to the tendency for $B_4C$ to severely oxidize above this range. Prior to processing, the part weighed 21.1 grams and after 6 cycles (no further increase in weight through 13 cycles was obtained) the weight had increased to 23.7 grams. The hardness changed from 45N-22 to 37 with no chromium oxide processing to 45N-42 to 64 at six impregnation-cure cycles to 45N-63-69 at 13 cycles. After the 13 cycles the variation in hardness readings became much less pronounced indicating that the body had a marked density (or porosity) non-homogeneity. It should be noted that processing was done in an air atmosphere oven. Based on other tests with boron carbide bodies initially chrome oxide bonded (rather than sintered as in the above sample), the use of an inert or reducing atmosphere should have provided much higher hardness values by reducing the formation of boron oxide during the heat cure cycles.

Only a very limited number of pre-formed non-oxide bodies have been readily available to use commercially, especially with a suitable interconnected pore structure. For this reason a fair sized group of nitrides, carbides, silicides, complex oxides, metals, metal alloys, etc. have been pressed in the laboratory from powders and underfired, cold pressed or chemically bonded into porous bodies suitable for treatment with our chromium oxide process. Weight gains and hardness values have been measured at different impregnation-cure cycle intervals to demonstrate that a very wide variety of such non-oxide pre-formed bodies can be significantly densified, hardened and strengthened.

Tests of representative bodies made by underfiring (partial sintering) of complex oxides, carbides, silicides, nitrides, borides and mixtures thereof are shown in Table XII. Data listed includes measured weights after 1, 3, 6, 9 and 13 impregnation-cure cycles along with Rockwell hardness values at 13 cycles. All samples listed were too soft to measure on the Rockwell tester prior to receiving the chromium oxide processing of this invention. All samples listed were pressed in the form of small rings about 1⅛ inches od × ⅝ inch id. with a thickness of about one-fourth inch. (In some cases only part of a ring was densified accounting for the low weight in Table XII for certain samples). Cure temperatures were limited to 1250°F or less as indicated in the Figure. Processing was by means of Method B. Chromic acid with a specific gravity of 1.65 was used in all cases as the impregnant.

Table XIII shows additional selected porous bodies pre-formed by pressing grains that were mixed with a small amount of potassium silicate (Philadelphia Quartz Co. Kasil No. 88 brand). A small amount of SAE20 motor oil and oleic acid were also added as a lubricant to aid in pressing. The parts were then cured at temperatures of 1250°F to establish the potassium silicate bond. The oil of course burns off long before this temperature is reached. The chromium oxide processing was again by means of Method B. The initial impregnation-cure cycle employed ZC-5 as the impregnant, Table IV. All other cycles used chromic acid at a specific gravity of ~1.65. It can be seen from the data that these chemically bonded porous bodies can be densified and hardened by means of our process as readily as the sintered bodies previously described.

TABLE XII

Sintered complex oxides, carbides, silicides, nitrides, borides and mixtures thereof chromium oxide densified, bonded and hardened

| Impregnation Liquid | : C-1.65 |
| Mixing Liquid Per | : $H_2O$ 1 gram |
| Amount of Grain | SAE 20 oil 0.3 gram |
| Listed Below | Oleic Acid 0.15 gram |

| Part No. | Refractory or Metal Grain | Mesh Size | Amount | Sintering Temperature | Maximum Cure Temperature | Weight in grams at number cycles | | | | | Hardness Rockwell | | Forming Pressure |
|---|---|---|---|---|---|---|---|---|---|---|---|---|---|
| | | | | | | 1× | 3× | 6× | 9× | 13× | 15N | 45N | |
| S-1 | $CeSnO_4$ | -325 | 15g | 1500°F | 1250°F | 5.15 | 5.7 | 6.5 | 7.05 | 7.3 | 95.0 | | 3000 lbf |
| S-2 | $CeTiO_4$ | -325 | " | 1500°F | 1250°F | 2.9 | 3.3 | 3.85 | 4.25 | 4.45 | 93.6 | | 2000 lbf |
| S-3 | $CeZrO_4$ | -325 | " | 1500°F | 1250°F | 7.7 | 8.65 | 9.7 | 10.4 | — | 93.8 | | 3000 lbf |
| S-4 | $MgO.Al_2O_3.ZrO_2$ | -325 | " | 1750°F | 1250°F | 6.75 | 7.5 | 8.3 | 8.95 | 9.05 | 87.3 | | 4000 lbf |
| S-5 | $MgTiO_3$ | -325 | " | 1500°F | 1250°F | — | — | 4.1 | 4.15 | 4.15 | 89.0 | | 4000 lbf |
| S-6 | $MgSnO_3$ | -325 | " | 1750°F | 1250°F | 4.1 | 4.5 | 5.0 | 5.4 | 5.4 | 90.6 | | 3000 lbf |
| S-7 | $SrZrO_3$ | -325 | " | 1500°F | 1250°F | — | — | 10.2 | 10.35 | 10.45 | 58.0 | | 8000 lbf |
| S-8 | SiC | 1200-RA | " | 1750°F | 1250°F | 3.7 | 4.6 | 5.65 | 6.15 | 6.2 | 93.1 | 66.8 | 8000 lbf |
| S-12 | $B_4Si$ | -200 | 15g | 1250°F | 1250°F | 4.05 | 4.55 | 4.65 | 4.75 | 4.8 | 76.2 | | 8000 lbf |
| S-13 | CrSi | -325 | " | 1750°F | 1250°F | 2.7 | 3.0 | 3.3 | 3.5 | 3.6 | 85.4 | | 8000 lbf |
| S-16 | $TiB_2$ | -325 | " | 1250°F | — | 8.75 | 8.8 | 8.85 | 8.9 | 9.0 | 69.9 | | 8000 lbf |
| S-17 | $VB_2$ | -325 | " | 900°F | 900°F | 6.45 | 6.5 | 6.5 | — | — | 68.0 | | 8000 lbf |
| S-19 | Al.BoroCarbide | -325 | " | 1250°F | — | — | — | — | — | — | — | | 8000 lbf |
| S-20 | SiC | 1200-RA | 6g | | | | | | | | | | |
| | $CeSnO_4$ | -325 | 6g | 1500°F | 1250°F | 6.8 | 7.6 | 8.55 | 8.9 | 9.0 | 95.4 | 75.4 | 8000 lbf |
| S-21 | SiC | 1200-RA | 5g | | | | | | | | | | |
| | $Si_3N_4$ | | 5g | 1750°F | 1250°F | 4.1 | 4.85 | 5.7 | 6.2 | 6.25 | 92.8 | 66.8 | 8000 lbf |
| S-23 | $VB_2$ | | 5g | | | | | | | | too soft | | |
| | $MgTiO_3$ | | 8g | 900°F | 900°F | 5.7 | 5.5 | 5.6 | — | — | to measure | | 8000 lbf |
| S-24 | Ni | -325 | 10g | | | | | | | | | | |
| | $Fe_3O_4$ | | 3g | 900°F | 900°F | 7.45 | 7.9 | 8.35 | 8.4 | 8.4 | 84.2 | | 8000 lbf |
| S-25 | VC | -325 | 15g | 900°F | 900°F | | 6.25 | 6.2 | 6.2 | 6.2 | 83.3 | | 8000 lbf |
| S-26 | $Cr_3C_2$ | | 8g | | | | | | | | | | |
| | $B_4Si$ | | 8g | 1250°F | 1250°F | 5.0 | 4.45 | 5.15 | 5.2 | 67.6 | | | 8000 lbf |

NOTE:
(1) Sample size 1⅛" outside diameter × ~⅝" inside diameter × ~¼" thick
(2) Processing method B was used with chromic acid impregnant (C-1.65) having a specific gravity ≈1.65.
(3) Rockwell Hardness values measured after 13 impregnation-cure cycle

TABLE XIII

Silicate bonded parts using chromium oxide processing method
Impregnation Liquid : ZC-5 and C-1.65 (see note 2 below)
Mixing Liquid Per : Kasil No. 88 1.0 gram
Amount of Grain   SAE 20 oil 0.3 gram
Listed Below      Oleic Acid 0.15 gram

| Part No. | Refractory or Metal Grain | Mesh Size | Amount | Sintering Temperature | Maximum Cure Temperature | Weight in grams at number cycles | | | | Rockwell Hardness | | Forming Pressure |
|---|---|---|---|---|---|---|---|---|---|---|---|---|
| | | | | | | 1× | 6× | 9× | 13× | 15N | 45N | |
| T-2 | $Cr_3C_2$ | −325 | 15g | 1250°F | 1250°F | 8.1 | 9.3 | 9.7 | 9.75 | 86.3 | 73.4 | 6000 lbf |
| T-3 | $CeSnO_4$ | ″ | ″ | ″ | ″ | 6.95 | 8.9 | 9.4 | 9.40 | 93.8 | 73.4 | ″ |
| T-4 | A-17 | ″ | ″ | ″ | ″ | 5.2 | 6.6 | 6.7 | 6.70 | 93.1 | 74.2 | ″ |
| T-5 | SiC-1200-RA | −1200 | ″ | ″ | ″ | 2.8 | 4.1 | 4.4 | 4.40 | 92.7 | 62.5 | ″ |
| T-6 | $Si_3N$ | −325 | ″ | ″ | ″ | 5.2 | 6.85 | 2.25 | 7.40 | 91.8 | 67.5 | ″ |
| T-8 | TiN | ″ | ″ | ″ | ″ | | 5.05 | 5.3 | 5.55 | 88.8 | | ″ |
| T-9 | $Fe_4N$ | ″ | ″ | ″ | ″ | | 5.69 | 5.9 | 6.05 | 75.4 | | ″ |

NOTE:
(1) Samples ~1⅛″ outside diameter × ~⅝″ inside diameter × ~¼″ thick
(2) Processing method B was used with ZC-5 impregnant for first impregnation-cure cycle followed by C-1.65 (chromic acid with specific gravity ≈1.65) for all additional cycles
(3) Kasil No. 88 is a potassium silicate (88 Be) solution made by the Philadelphia Quartz Co.
(4) Rockwell Hardness values measured after 13 impregnation-cure cycles Cold pressed metal bodies densification data is covered by Table XIV. These parts were made by pressing metal powders at a pressure high enough to cause "cold welding" at the contacting grain interfaces. Some degree of interlocking of the particulate structure also probably is contributing to the "as pressed" strength. As in the case of the sintered or chemically bonded refractory grains or the sintered metal bodies described earlier in this disclosure, an excellent chromium oxide bonding, densification and strengthening occurs. Obviously, because of the high metal content of these processed bodies, the Rockwell hardness values are not as great as for most of the refractory materials. The chromium oxide processing was identical to that used for the parts just described in Table XIII.

2. Chromium Oxide Processing of Chromium Oxide Bonded Bodies

This section covers a special case of the preformed bodies described in Section 1 above, where the initial bond is made by means of a chromium compound, converted by heat to a chromium oxide. Subsequent chromium oxide processing by means of our multiple impregnation-cure cycle method will likewise provide parts with significantly increased hardness, strength and density in the same way as already shown for the processing of preformed bodies bonded by sintering, and other means.

Our co-pending patent application Ser. No. 694,303, now U.S. Pat. No. 3,789,096 describes a large number of refractory oxides, carbides, metals, etc. that can be chrome oxide bonded and subsequently chrome oxide densified, hardened and strengthened. The purpose here is to add materials that we have now found can be similarly processed.

TABLE XIV

Cold pressed powdered metal parts chromium oxide processed
Impregnation Liquid : ZC-5 and C-1.65 (see note 2 below)
Mixing Liquid : None — Dry Pressed

| Part No. | Refractory or Metal Grain | Mesh Size | Amount (Parts by Weight) | Maximum Cure Temperature | Weight in grams at number cycles | | | | | Rockwell Hardness | | Forming Pressure |
|---|---|---|---|---|---|---|---|---|---|---|---|---|
| | | | | | 1× | 3× | 6× | 9× | 13× | 15T | 15N | |
| M-1 | Ti | −325 | | 1250°F | 8.75 | 10.05 | 10.3 | 10.4 | 10.45 | | 84.9 | 10,000 lbf |
| M-2 | ″ | ″ | | 1250°F | 6.5 | 6.95 | 7.0 | 7.0 | 7.05 | | 85.6 | 15,000 lbf |
| M-3 | 410 S.S. | ″ | | 1250°F | 15.4 | 16.7 | 17.5 | 18.0 | 18.0 | | 58.8 | 10,000 lbf |
| M-4 | ″ | ″ | | 1250°F | 10.0 | 10.6 | 10.9 | 11.2 | 11.25 | | 54.7 | 20,000 lbf |
| M-5 | Ce | ″ | | 1250°F | 9.75 | 10.25 | 10.25 | 10.3 | 10.3 | | 76.0 | 15,000 lbf |
| M-6 | ″ | ″ | | 1250°F | 9.45 | 9.75 | 9.75 | 9.8 | 9.8 | | 75.6 | 20,000 lbf |
| M-7 | Al (Alcoa No. 123) | pigment grade | | 900°F | 5.3 | 5.95 | 6.0 | 6.0 | 6.0 | 33.5 | <0 | 4,000 lbf |
| M-8 | Al (Alcoa No. 123) | pigment grade | | 900°F | | 5.05 | 5.1 | 5.1 | 5.1 | 31.6 | <0 | 10,000 lbf |
| M-9 | Ni | −325 | | 1250°F | 6.9 | 7.15 | 7.15 | 7.15 | 7.15 | | 61.9 | 15,000 lbf |
| M-11 | Mn Fe | −325 −100 | 1 1 | 900°F | 5.75 | 6.0 | 6.0 | 6.0 | 6.0 | | 74.4 | 15,000 lbf |
| M-12 | 410 S.S. Co | −325 ″ | 1 1 | 1250°F | | | 20.0 | 20.2 | 20.25 | | 71.8 | 15,000 lbf |
| M-13 | Al (Alcoa No. 123) TiN | −325 | 8 3 | 900°F | | 4.3 | 5.15 | 5.25 | 5.25 | | 12.3 | 15,000 lbf |
| M-14 | Al (Alcoa No. 123) TiN | −325 | 2 1 | 900°F | | 5.8 | 6.3 | 6.4 | 6.45 | 50.5 | <0 | 15,000 lbf |

NOTE:
(1) Samples cold pressed ~ 1⅛″ outside diameter × ⅝″ inside diameter × ¼″ thick
(2) processing method B was used with ZC-5 impregnant for first impregnation cure cycle followed by C-1.65 (chromic acid with specific gravity ~1.65) for all additional cycles
(3) Rockwell Hardness values measured after 13 impregnation cure cycles These materials include nitrides, borides, intermetallics, complex oxides, ferrites, etc., as well as mixtures between these including with oxides, carbides and metals. As stated earlier, we have found that most any material can be chrome oxide bonded and subsequently processed that either is an oxide, has an oxide constituent, or will form a well adhering oxide layer on its surfaces. This of course assumes that there is no reaction with the impregnant and that the material is capable of withstanding the cure temperature used for the processing.

In addition to slip cast, pressed, extruded or otherwise formed fine grain particulate materials, this chrome oxide bonding and densification process can be used with fibrous and other non-granular or non-powdered materials. For example, glass, ceramic or metal fibers, ceramic whiskers, or woven glass, ceramic or metal cloth. The discrete particles, fibers, wires, etc. of the suitable materials to be bonded merely need to come in intimate (close) contact with each other in order to form capillary or interstice small enough to retain the soluble chromium compound in position during the impregnation-heat cure cycle while the chrome oxide bond is being formed.

Table XV shows Rockwell hardness values for a number of slip cast parts made from silicon nitride ($Si_3N_4$) grain. Also included are parts made with silicon nitride mixed with various amounts and grain sizes of silicon carbide (SiC), aluminum oxide ($Al_2O_3$), chromium oxide ($Cr_2O_3$), zirconium silicate ($ZrSiO_4$), and a form of silica (listed as $H_2SiO_3$). These parts were slip cast using the chromium "binding" liquid indicated and include: magnesium chromates (MC-1 and MC-2), chromic acid with a specific gravity of 1.7 (C-1.7) and a complex chromium compound made by dissolving chromium oxide in chromic acid (C-7).

cycles at the maximum cure temperatures as listed in the Table XV. The aluminum oxide grains used in the tests of Table XV are listed at T-61-325 (which is a -325 mesh tabular alumina made by Alcoa) and XA-17 and XA-16-SG (which are reactive grades of alpha alumina also made by Alcoa). All samples shown were slip cast as either small discs about 1 inch in diameter by ¼ inch thick or they were cast as plates and then cut into ¼ inch × ¼ inch × 4 inches bars after 2 to 4 impregnation-cure cycles. Slip casting was done by making a slurry of the grains with 2 parts water and 1 part chromium binder and pouring into metal molds laid on top of a plate of plaster of paris. The method is identical to that in general use for slip casting ceramic parts except that the chromium binder is added to the water normally used. The parts can usually be removed from the plaster within a matter of minutes after the free liquid has gone into the plaster and the parts placed directly into a 350°F oven for the start of the curing cycle. With the materials used in Table XV the initial chrome oxide bond was strong enough to allow normal handling of the parts during the subsequent chromium oxide densification, hardening and strengthening process. As can be seen from the Figure, most of these parts reached very high hardness values.

Table XVI shows flexural strength (modulus of rupture) values obtained for some silicon nitride slip cast

TABLE XV

Hardness values obtained with a variety of chrome oxide bonded silicon nitride and silicon nitride containing mixtures after chrome oxide densification

| Impregnation Liquid | | C-1.7 | | | |
|---|---|---|---|---|---|
| Number cure cycles | | 13× | | | |
| Forming Method | | Slip Cast | | | |
| Maximum Cure Temperature | | 1250°F | | | |
| Part No. | Refractory Formulation | Mesh Size | Parts By Weight | Binder Liquid | Rockwell 15N | Hardness 45N |
|---|---|---|---|---|---|---|
| 1651 | $Si_3N_4$ | −325 | | MC-2+$H_2O$ (2:1) | 92.2 | 75.3 |
| 1 | $Si_3N_4$ | −325 | | C-1.7+$H_2O$ (2:1) | 95.5 | 82.1 |
| 3 | $Si_3N_4$ | −325 | 3.2 | | | |
|  | T-61 | −325 | 3.9 | " | 96.5 | 83.6 |
| 4 | $Si_3N_4$ | −325 | 3.2 | | | |
|  | XA-17 | | 3.9 | " | 95.9 | 82.3 |
| 5 | $Si_3N_4$ | −325 | 1 | | | |
|  | SiC-1000RA | | 1 | " | 96.4 | 84.1 |
| 2 | $Si_3N_4$ | −325 | 1 | | | |
|  | SiC-1200-RA | | 1 | MC-1+$H_2O$ (2:1) | 95.5 | 81.2 |
| 362 | $Si_3N_4$ | −325 | 3.2 | | too soft | |
|  | $Cr_2O_3$ | −180 | 5.2 | C-1.7+$H_2O$ (2:1) | to measure | 79.1 |
| 522 | $Si_3N_4$ | −325 | 3.2 | C-7+$H_2O$ (2:1) | too soft | |
|  | SiC-1200-RA | | 3.2 | | to measure | 80.4 |
|  | KA-16-SG | | 3.9 | | sure | |
| 527 | $Si_3N_4$ | −325 | 3.2 | | | |
|  | $ZrCiO_4$ | −325 | 4.7 | C-1+$H_2O$ (2:1) | " | 75.4 |
| 614 | $Si_3N_4$ | −325 | 3.2 | | | |
|  | $ZrSiO_4$ | −325 | 4.7 | C-7+$H_2O$ (2:1) | " | 77.0 |
| 616 | $Si_3N_4$ | −325 | 3.2 | | | |
|  | SiC-1200-RA | | 3.2 | " | " | 79.8 |
| 617 | $Si_3N_4$ | −325 | 3.2 | | | |
|  | SiC-220-RA | | 1.6 | | | |
|  | SiC-FFFF-RA | | 1.6 | " | " | 81.8 |
| 618 | $Si_3N_4$ | −325 | 3.2 | | | |
|  | XA-17 | | 3.9 | " | " | 79.6 |
| M-38 | $Si_3N_4$ | −325 | 3.2 | | | |
|  | $H_2SiO_3$ | | 2.3 | " | " | 76.9 |

NOTE:
(1) Part No. 5 cured at 2000°F on 13× cycle only
(2) Binder: $H_2O$ mixtures by volume
(3) Processing by method B These solutions are disclosed in Table IV. Processing was by means of Method B using 13 impregnation-cure bodies of the types shown in the preceding table. The processing was also identical.

TABLE XVI

Modulus of rupture values obtained with a variety of chrome oxide bonded silicon nitride and silicon nitride containing mixtures of chrome oxide densification Impregnating Liquid: C-1.7
Number cure cycles: 13×
Forming Method: Slip Cast
Maximum Cure Temperature: 1250°F

| Part No. | Refractory Formulation | Mesh Size | Parts by Weight | Binder Liquid | M.O.R. psi | Modulus of Elasticity psi |
|---|---|---|---|---|---|---|
| * 002 | $Si_3N_4$ | −325 |  | C-1.7+$H_2O$ (2:1) | 21,662 | not measured |
| 104 | $Si_3N_4$ | −325 | 1 |  |  |  |
|  | SiC-1200-RA |  | 1 | " | 16,202 | $30.0 \times 10^{-6}$ |
| * 023 | $Si_3N_4$ | −325 | 1 |  |  |  |
|  | SiC-1000-RA |  | 1 | " | 20,917 | $34.5 \times 10^{-6}$ |
| 033 | $Si_3N_4$ | −325 | 1 |  |  |  |
|  | SiC-FFFF-RA |  | 1 |  |  |  |
|  | SiC-1000-RA |  | 1 | " | 20,262 | $37.6 \times 10^{-6}$ |
| 012 | $Si_3N_4$ | −325 | 2 |  |  |  |
|  | SiC-FFFF-RA |  | 1 |  |  |  |
|  | SiC-220-RA |  | 1 | " | 27,970 | $35.0 \times 10^{-6}$ |
| 009 | $Si_3N_4$ | −325 | 3.2 |  |  |  |
|  | T-61- | −325 | 3.9 | " | 25.786 | $37.0 \times 10^{-6}$ |
| 031 | $Si_3N_4$ | −325 | 3.2 |  |  |  |
|  | XA-17 |  | 3.9 | " | 15,419 | $32.9 \times 10^{-6}$ |
| * 106 | $Si_3N_4$ | −325 | 3.2 | C-7+$H_2O$ (2:1) | 20,407 | not measured |
|  | SiC-1200-RA |  | 3.2 |  |  |  |
|  | XA-16-SG |  | 3.9 |  |  |  |

NOTE:
(1) Parts Marked * were cured at 2000°F on last (13×) cycle only
(2) Test bars were ~¼" × ¼" × 5"
(3) Processing by method B
(4) Binder: $H_2O$ mixtures by volume Some of these samples were also measured for modulus of elasticity using a sonic velocity method. These results are also listed in the table where measured.

Thermal expansion data was measured for Samples 002, 009 and 069, slip cast materials comprised of silicon nitride, silicon nitride-aluminum oxide mixture and silicon nitride-silicon carbide mixture as shown in Tables XVII, XVIII and XVIX, respectively. As might be expected, the measured expansion rates of these chrome oxide bonded and densified mixtures follow closely the published expansion rates of the constituent materials according to the proportions of each refractory involved.

Table XX shows hardness data measured for a sizeable group of nitrides, borides, intermetallics and mixtures thereof including mixture with carbides, oxides, complex oxides and metals. All samples were made as pressed rings approximately 1⅛ inch od. × ⅝ inch id. × ¼ inch thick. The chromium binder was thoroughly mixed with the powder or grains to be pressed along with a small amount of SAE 20 nondetergent motor oil plus oleic acid to act as a lubricant. The lubricant aids in obtaining a fine porosity in the pressed part due to improved compaction. The chromium binders employed in this test series included a concentrated chromium chloride solution (CC-1) mixed 1:1 by volume with water and zinc di-chromate (ZC-2) also mixed with water 1:1 by volume. See Table IV for specifics on these and other binders. Processing was by means of Method H using the maximum cure temperature indicated in the table. Method H is the same as Method B except:

TABLE XVII

Thermal expansion data for chrome oxide bonded and densified silicon nitride
Bar No. 002
Forming Method: Slip Cast

| Composition |  | 100°C | 200°C | 300°C | 400°C | 500°C | 600°C | 700°C |
|---|---|---|---|---|---|---|---|---|
|  |  | Average Expansion in PPM From 20°C ||||||||
| $Si_3N_4$ | −325 | 200 | 600 | 1050 | 1500 | 1925 | 2400 | 2825 |

Note:
See Table XVI for processing details

TABLE XVIII

Thermal expansion data for a chrome oxide bonded and densified mixture of silicon nitride and aluminum oxide
Bar No. 009
Forming Method: Slip Cast

| Composition |  | 100°C | 200°C | 300°C | 400°C | 500°C | 600°C | 700°C |
|---|---|---|---|---|---|---|---|---|
|  |  | Average Expansion in PPM from 20°C ||||||||
| $Si_3N_4$ −325 (3.2)* $Al_2O_3$ T-61 −325 (3.9)* |  | 325 | 835 | 1460 | 2087 | 2700 | 3300 | 3862 |

*Parts by Weight — See Table XVI for processing details

TABLE XIX

Thermal expansion data for a chrome oxide bonded and densified mixture of silicon nitride and silicon carbide
Bar No. 069
Forming method     Slip Cast

| Composition | | Average Expansion in PPM From 20°C | | | | | | |
|---|---|---|---|---|---|---|---|---|
| | | 100°C | 200°C | 300°C | 400°C | 500°C | 600°C | 700°C |
| SiC -1000-RA | (1)* | | | | | | | |
| SiC -1200-RA | (1)* | | | | | | | |
| $Si_3N_4$ -325 | (1)* | 277 | 735 | 1237 | 1755 | 2280 | 2790 | 3240 |

*Parts by Weight — See Table XVI for processing details

TABLE XX

HARDNESS DATA FOR PRESSED, CHROME OXIDE BONDED AND DENSIFIED SPECIMENS MADE FROM NITRIDES, BORIDES, INTERMETALLICS AND MIXTURES THEREOF INCLUDING MIXTURES WITH CARBIDES, OXIDES, COMPLEX OXIDES AND METALS

| Part No. | Refractory or Metal Grain | Mesh Size | Amount | Binder Liquid | Forming Pressure | Impregnating Liquid | Maximum Cure Temperature |
|---|---|---|---|---|---|---|---|
| 6-734 | $B_4Si$ | −200 | 15g | CC-1* 1.0g<br>SAE 20 oil 0.3g<br>Oleic Acid 0.15g | 12,000 psi | C-1.65 | 1250°F |
| 6-735 | $B_4Si$<br>$Cr_2O_3$(G-4099) | −200<br>~2cc | 15g<br>12g | " | " | " | " |
| 6-736 | $CrSi_2$ | −325 | 20g | " | " | " | " |
| 6-737 | $CrSi_2$<br>ZnS | −325<br>−1000 | 20g<br>12g | " | " | " | " |
| 6-738 | TiN | −325 | 15g | " | " | " | " |
| 6-742 | $Fe_4N$ | −325 | 20g | " | " | " | " |
| 6-744 | $TiB_2$ | −325 | 20g | " | " | " | " |
| 6-745 | $TiB_2$<br>$Cr_2O_3$(G-4099) | −325<br>~2cc | 20g<br>6g | " | " | " | " |
| 6-746 | $TiB_2$<br>$Si_3N_4$ | −325<br>−325 | 10g<br>10g | " | " | " | " |
| 6-747 | "<br>" | " | 5g<br>15g | " | " | " | " |
| 6-748 | $MoB_5$ | −325 | 20g | " | " | " | " |
| 6-749 | $MoB_5$<br>$Si_3N_4$ | −325<br>−325 | 20g<br>10g | " | " | " | " |
| 6-750 | $VB_2$ | −325 | 20g | " | " | " | " |
| 6-751 | $VB_2$<br>Ni-metal | −325<br>−500 | 10g<br>20g | " | " | " | " |
| 6-752 | $CrSi_2$<br>SiC | −325<br>−1200 | 10g<br>10g | " | " | " | " |
| 6-755 | $Si_3N_4$<br>$CeTiO_4$ | −325 | 8g | " | " | " | " |
| 6-756 | $Si_3N_4$<br>$CaZrO_3$ | −325<br>−325 | 8g<br>10g | " | " | " | " |
| 6-757 | $Si_3N_4$<br>$CeSnO_4$ | −325<br>−325 | 8g<br>12g | " | " | " | " |
| 6-758 | TiN<br>$Si_3N_4$ | −325<br>−325 | 6g<br>9g | " | " | " | " |
| 6-759 | $Fe_4N$<br>A-15-SG | −325<br>~2cc | 6g<br>9g | " | " | " | " |
| 6-760 | $B_4Si$<br>$CrSi_2$ | −200<br>−325 | 5g<br>9g | " | " | " | " |
| 6-762 | ZnS<br>SiC | −325<br>−1200 | 5g<br>13g | ZC-2* 2g<br>SAE 20 oil 0.3g<br>Oleic Acid 0.15g | " | " | " |
| 6-763 | ZnS<br>Fe-metal | −1000<br>−100 | 10g<br>35g | | | | |
| 6-766 | $MoB_5$<br>$Al_2O_3$(A-17) | −325<br>−325 | | CC-1* 1.0g<br>SAE 20 Oil 0.3g<br>Oleic acid 0.15g | " | " | " |
| 8-768 | TiN | −325 | 15g | ZC-2* 2.0g<br>SAE 20 oil 0.3g<br>Oleic Acid 0.15g | 16,000 psi | " | 900°F |
| 8-769 | $Fe_4N$ | − 325 | 20g | " | " | " | " |
| 8-770 | $Fe_4N$<br>Al metal (No. 123) | −325<br>−325 | 8g<br>8g | ZC-2* 2.0g<br>SAE 20 oil 0.3g<br>Oleic Acid 0.15g | 16,000 psi | " | 1250°F |
| H-1 | $Si_3N_4$<br>$Al_2O_3$(A-15SG) | −325<br>~2cc | 15g<br>15g | CC-1* 2g<br>SAE 20 oil 0.6g<br>Oleic Acid 0.3g | 2,000 psi | " | " |

| Part No. | Weight in Grams at Cycles | | | | | 15N-Rockwell Hardness | | Remarks |
|---|---|---|---|---|---|---|---|---|
| | 0× | 3× | 6× | 9× | 13× | 9× | 13× | |
| 6-734 | 4.20 | 4.90 | 5.05 | 5.10 | 5.15 | NM* | 61.0 | |
| 6-735 | 7.75 | 8.30 | 8.45 | 8.55 | 8.70 | NM* | 81.0 | |
| 6-736 | 6.80 | 7.90 | 8.70 | 8.95 | 9.00 | NM* | 83.3 | |
| 6-737 | 9.70 | 9.85 | NM* | NM* | NM* | 55.7 | NM* | |
| 6-738 | 7.10 | 9.25 | 10.25 | 10.75 | 10.75 | NM* | 88.5 | |
| 6-742 | 9.85 | 12.50 | 13.50 | 13.95 | 14.15 | " | 54.7 | a |
| 6-744 | 4.70 | 5.35 | 5.35 | 5.45 | 5.50 | " | 71.1 | |
| 6-745 | 8.70 | 9.25 | 9.30 | 9.40 | 9.45 | " | 85.9 | |

TABLE XX-continued
HARDNESS DATA FOR PRESSED, CHROME OXIDE BONDED AND DENSIFIED SPECIMENS MADE FROM NITRIDES, BORIDES, INTERMETALLICS AND MIXTURES THEREOF INCLUDING MIXTURES WITH CARBIDES, OXIDES, COMPLEX OXIDES AND METALS

| Part No. | Refractory or Metal Grain | Mesh Size | Amount | Binder Liquid | Forming Pressure | Impregnating Liquid | Maximum Cure Temperature | |
|---|---|---|---|---|---|---|---|---|
| 6-746 | 6.20 | 7.00 | 7.10 | 7.25 | 7.35 | '' | 81.2 | |
| 6-747 | 6.80 | 8.20 | 8.85 | 9.10 | 9.25 | '' | 87.7 | |
| 6-748 | 6.85 | 6.35 | NM* | NM* | NM* | 78.7 | NM* | b |
| 6-749 | 6.90 | 6.50 | 6.10 | NM* | NM* | 80.0 | NM* | c |
| 6-750 | 6.20 | 6.30 | 6.30 | NM* | NM* | 78.0 | 73.7 | c |
| 6-751 | 9.95 | 10.80 | 10.70 | NM* | NM* | 59.4 | NM* | |
| 6-752 | 4.35 | 5.60 | 6.65 | 7.25 | 7.45 | NM* | 8.73 | |
| 6-755 | 4.80 | 5.90 | 6.75 | 7.20 | 7.25 | NM* | 70.70 | |
| 6-756 | 6.15 | 7.10 | 7.80 | 8.30 | 8.60 | NM* | 83.4 | |
| 6-757 | 7.00 | 8.40 | 9.45 | 10.05 | 10.50 | NM* | 93.0 | |
| 6-758 | 5.50 | 7.35 | 8.80 | 9.75 | 10.25 | NM* | 95.3 | c |
| 6-759 | 7.25 | 8.70 | 9.25 | 9.40 | 9.50 | NM* | 76.6 | c |
| 6-760 | 4.50 | 5.25 | 5.55 | 5.60 | 5.70 | NM* | 75.7 | |
| 6-762 | 3.20 | 4.10 | 4.80 | 5.35 | 5.75 | | 93.1 | |
| 6-763 | 8.60 | 9.70 | 9.75 | 9.75 | 9.75 | | 75.4 | |
| 6-766 | 8.90 | 10.05 | 10.85 | 11.10 | 11.10 | | 92.5 | |
| 8-768 | NM* | 5.05 | 5.50 | 5.85 | 5.90 | NM* | 87.3 | |
| 8-769 | NM* | 6.90 | 7.20 | 7.45 | 7.45 | NM* | 77.3 | |
| 8-770 | NM* | 4.60 | 4.80 | 4.90 | 4.90 | NM* | 20.7 | |
| H-1 | 5.43 | NM* | NM* | 7.90 | 7.96 | NM* | 95.0 | |

NM* = Not Measured
Remarks: a. part expanded on first cure cycle.
    b. surface of part oxidized during processing.
    c. oxidized during processing.
Notes:
1. Binder liquids marked (*) were mixed with $H_2O$ at a ratio of 1:1 by volume.
2. Processing was done by Method H at maximum cure temperature indicated.
3. Pressed part size was ~1¼" od. × ⅝" id. × ⅛" thick rings.

d. Cure cycle:
20 min. at 350°F
20 min. at 750°F
20 min. at 900°F
20 min. at 1250°F
60 min. cool down from 1250°F to room temperature
remove any excess oxide build-up on parts after each cure cycle Weights were measured after the initial chromium oxide bonding (labelled "Ox" in table) and again after 3, 6, 9 and 13 impregnation-cure cycles when applicable. 15-N Rockwell hardness values are also shown for these samples either at 13 cycles or after a significant hardness and strength had been achieved. Again, it can be seen from an examination of the data that a wide variety of materials can be bonded, densified and hardened by means of the chromium oxide bonding process of this invention. The term particulate in this application is intended to mean both finely divided powders and fibers and filaments woven and unwoven.

A variety of glass and ceramic fiber insulation material (non-bonded type) has been bonded by means of our chromium oxide bonding method. The technique employed consists of saturating the fiber mat with the binder and then centrifuging at a high enough r.p.m. to remove the excess binder from the large spaces between fibers, retaining the binder only where fibers actually cross and touch each other. Curing was done starting at 350°F for about 20 minutes, 700°F for 20 minutes, 900°F for 20 minutes and finally 1250°F for 20 minutes. This method worked very well and provided a well bonded and significantly stiffened structure. Table XXI lists a variety of such fiber samples that have been chrome oxide bonded with the process of this invention. Table XXII shows the same impregnating and processing method, Method H, applied to non-bonded metal fiber structures. In either the glass, ceramic, or the metal fiber structues listed in Tables XXI or XXII, a microscopic examination showed that a bond did indeed exist at every point where the fibers touched each other. Only a very thin surface coating of fibers could be detected elsewhere. In reality, this is just another variation of the basic process and illustrates that bonding will take place wherever suitable capillaries exist that can retain the soluble chromium compound and establish a chromium oxide bond upon heating. In the case of the aluminum metal fibers the maximum cure temperature was limited to 900°F. Although not shown in Tables XXI and XXII, additional impregnation-cure cycles resulted in increased density and strength.

Still another chromium oxide processing variation was tried involving the bonding, densification and strengthening of flexible, non-bonded, woven S-glass cloth. Here the bond was primarily established between the fine fibers making up the strands and where the strands of the warp and woof cross over each other. Processing was by means of soaking the cloth in impregnant and then draining off excess liquid by placing the specimens on a paper towel. Curing involved 15 minute cycles in a 350°F, 700°F, 900°F and 1250°F oven, respectively. Impregnants employed including magnesium and zinc chromate-chromic acid solutions MC-2, MC-4, MC-6, MC-10, ZC-2, ZC-4, ZC-8 and ZC-10.

TABLE XXI
CHROMITE-CHROME OXIDE BONDED GLASS AND REFRACTORY FIBERS

| Sample No. | Type of Fiber (a) | Impregnating Liquid (f) | Number of Cure Cycles | Maximum Cure Temperature | Density lb/ft³ (d) | Stiffness (e) | Remarks |
|---|---|---|---|---|---|---|---|
| 20 | Microquartz | ZC-5 | 3× | 1250°F | 39.7 | Stiffer than | Fused Silica Fiber |

TABLE XXI-continued

CHROMITE-CHROME OXIDE BONDED GLASS AND REFRACTORY FIBERS

| Sample No. | Type of Fiber (a) | Impregnating Liquid (f) | Number of Cure Cycles | Maximum Cure Temperature | Density lb/ft³ (d) | Stiffness (e) | Remarks |
|---|---|---|---|---|---|---|---|
| | | | | | | 23, 26 and 29 | |
| 23 | B-Fiber Chrome | " | " | " | 24.2 | Medium Stiffness | Refractory Oxide Fiber |
| 26 | A-Cera Fiber | " | " | " | 24.2 | Medium Stiffness | Refractory Oxide Fiber |
| 29 | SK Fiber | " | " | " | 17.3 | Least Stiff of all the Samples | Glass Fiber |

Notes:
1. Non-bonded fiber "bats" supplied by Johns-Manville Corp.
2. Specimen size was approximately 2" × 2" × 1".
3. Parts were centrifuged at 2500 rpm (with an arm length of ~10") to remove excess impregnant from large voids between fibers after each impregnation cycle.
4. Density of non-bonded "bats" was increased by a factor of at least 3 after processing.
5. All samples had very low stiffness prior to processing. Stiffness increased very considerably after the three impregnation-cure cycles.
6. Processing done by Method H at maximum cure temperature indicated above using ZC-5 impregnant as described in Table IV.

TABLE XXII

CHROMITE BONDED METAL FIBERS

| Sample No. | Type of Fiber | Impregnating Liquid | Number of Cure Cycles | Maximum Cure Temperature | Remarks |
|---|---|---|---|---|---|
| C | Aluminum Wool (fine) | MC-2 | 3× | 1050°F | Fiber Bonded together where contact is made |
| F | Stainless Steel Wool (fine) | " | " | 1250°F | " |
| I | Bronze Wool (fine) | " | " | 1250°F | " |

Notes:
1. All samples were about 1½" in diameter × ½" thick.
2. Processing done by Method H at maximum cure temperature indicated above using MC-2 (magnesium di-chromate) impregnant as described in Table IV.
3. Fiber samples were centrifuged at 2500 rpm (with an arm length of ~10") to remove excess impregnant from large voids between fibers after each impregnation cycle.
4. Non-bonded metals wools purchased from commercial hardware supply house.

See Table IV for details. Impregnation-cure cycles were varied from 3 to 13 times. The test results can be generally summarized in that maximum stiffness after a few impregnation-cure cycles (such as 3-4 cycles) is obtained with high chromate content solutions such as MC-2 to MC-4 or ZC-2 to ZC-5. Solutions having a higher chromic acid to chromate ratio such as MC-8 or -10 or ZC-8 or -10 will produce a stiffer, harder, more brittle sample but require more cycles to accomplish this (e.g. 7-13 cycles).

There are also a number of miscellaneous non-oxide materials that can be chrome oxide bonded and densified, hardened and strengthened with out process. Among these are such compounds as ferrites, aluminides, etc. For example barium ferrite grain of the order of -325 mesh size was bonded using a zinc chromate binder, ZC-5 (see Table IV) and pressed into a 1 inch diameter disc about ⅜ inch thick using a forming pressure of 5000 psi. After three impregnation-cure cycles using Method B and 1250°F maximum cure temperature the hardness measured 15N-67.1, on the Rockwell tester. At this number of cycles the disc had adequate strength for its intended purpose as a permanent magnet. (Subsequently placing in a strong magnetic field did in fact cause the disc to become permanently magnetized although the efficiency was only about equivalent to a plastic bonded magnet).

3. Chromium Oxide Processed Coatings

Our co-pending application Ser. No. 7,948 covers the use of our chromium oxide bonding, densification and hardening process for coatings consisting of oxides, mixtures of oxides and metal or metal alloys. We will now show that a number of other refractories may be used for the particulate materials comprising such coatings.

The slurry type coatings are unique, from the chromium oxide bonding and densification of solid bodies, in that a chromium oxide bond is established not only between the particulate materials, grains or powders used to form the coating, but also between the coating and the substrate.

When coatings are bonded to non-oxide substrates such as metals, carbides, etc., it is believed that the chromium oxide bond is actually established to a thin oxide film that is usually inherent, or at least is subsequently formed, on the substrate during the initial heat-cure cycle.

A number of such coatings bonded to a variety of substrates are shown in Table XXIII. These include coatings where the basic grains or powders used in the slurry are carbides, nitrides, borides, silicides, complex oxides and mixtures thereof, including mixtures with oxides and metal powders. These coatings have been applied as a slurry to the substrates shown in the figure using a small brush. They could have also been applied using an airbrush or dipping method depending on the part shape, coating thickness desired, etc. The slurry is prepared by mixing the powder or grains with water and the chromium based binder until a relatively thin consistency is achieved.

In Table XXIII the initial binder used with the coating slurry is in all cases ZC-5, a zinc chromatechromic acid solution as per Table IV. This has been mixed with water in a ratio of 1:2 by volume. In many cases it has been found that evacuating the slurry prior to application assures that all of the grains are wet with binder and eliminates lumps and air bubbles. The coatings in Table XXIII were all made using slurries evacuated in this manner.

TABLE XXIII

CHROMIUM OXIDE BONDED, DENSIFIED AND HARDENED SLURRY TYPE COATINGS EMPLOYING A VARIETY OF NON-OXIDE AND NON-METAL POWDERS

Binding Liquid: ZC-5 + $H_2O$ (1:2)
Impregnating Liquid: C-1.65
Number of Cure Cycles: 13× for all samples except
    5× for Cx, D & 13-8
Maximum Cure Temperature: 1250°F for all samples except
    900°F for Cx, D, 13-8, B, C & T-5

| Sample No. | Basic Slurry Powders | Parts by Weight | Mesh Size | Substrate | Substrate Size | Substrate Surface Preparation | Coating Thickness | Cracks | Rockwell Hardness 15N | Rockwell Hardness 45N |
|---|---|---|---|---|---|---|---|---|---|---|
| C-2 | $CeZrO_4$ | | −325 | Alumina, 94% Grade | ⅝" dia. | None | ~.006" | Few Fine Cracks | 93.2 | 70.0 |
| C-3 | $MgO.Al_2O_3ZrO_2$ | | " | " | " | " | " | None | 88.3 | NM* |
| C-4 | $MgTiO_3$ | | " | " | " | " | " | Few Fine Cracks | 90.4 | " |
| C-6 | $Cr_3Si$ | | " | " | " | " | " | None | 82.1 | " |
| C-7 | $Cr_3C_2$ | | " | " | " | " | " | " | 91.6 | 72.3 |
| C-9 | $TiB_2$ | | " | " | " | " | ~.009" | " | 87.7 | NM* |
| C-10 | $B_4Si$ | | −200 | " | " | " | " | " | 69.7 | " |
| | | | | | | | ~.006" | | | |
| 20-1 | $MgO.M_2O_3.ZrO_2$ | 2 | −325 | 1020 Steel | 1½" dia. | Nickel Flash Plating Over Light Grit Blasting | " | " | 69.4 | " |
| | $H_2SiO_3$ | 3 | | | | | | | | |
| 20-3 | $SrZrO_3$ | 4 | −325 | 1020 Steel | 1½" dia. | Nickel Flesh Plating over Light Grit Blotting | ~.006" | None | 58.5 | NM* |
| | $H_2SiO_3$ | 7 | −200 | | | | | | | |
| 20-4 | $Cr_3Si$ | 2 | −325 | | | | | | | |
| | | 3 | −200 | " | " | " | " | " | 58.8 | " |
| 20-5 | $B_4Si$ | 1 | −200 | " | " | " | " | " | 66.0 | " |
| | $H_2SiO_3$ | 4 | −200 | | | | | | | |
| 20-6 | $Cr_3C_2$ | 2 | −325 | " | " | " | " | " | 62.4 | " |
| | $H_2SiO_3$ | 3 | −200 | | | | | | | |
| 20-10 | $TiB_2$ | 1 | −325 | " | " | " | " | " | 74.5 | " |
| | Ni-metal | 4 | −500 | | | | | | | |
| Cx | $Si_3N_4$ | 1 | −325 | " | " | $HNO_3$ etched, Oxidized 900°F | ~.008" | " | 84.2 | " |
| | Mn-metal | 12 | −325 | | | | | | | |
| D | TiN | 1 | −325 | " | " | " | " | " | 80.4 | " |
| | Mn-metal | 8 | −325 | | | | | | | |
| 13-8 | $Fe_4N_2$ | 1 | −325 | " | " | " | " | " | 81.6 | " |
| | Mn-metal | 6 | −325 | | | | | | | |
| B | $VB_2$ | | −325 | SiC coated Graphite (Dow Corning) | 1¼" × 1¼" | None | ~.005" | Very Fine Crazing | 79.7 | " |
| C | VC | | −325 | " | " | " | " | " | 69.2 | " |
| T-1 | $TiB_2$ | 3 | −325 | Titanium GAl-4v alloy | 1½" dia. | Grit Blasted | ~.006" | None | 87.9 | " |
| | $H_2SiO_3$ | 7 | | | | | | | | |
| T-2 | $MgTiO_3$ | 2 | −325 | Titanium Gal-4v alloy | 1½" dia. | Grit Blasted | ~.006" | None | 87.8 | NM* |
| | $H_2SiO_3$ | 3 | −200 | | | | | | | |
| T-3 | $CeTiO_4$ | 2 | −325 | " | " | " | " | " | 90.0 | " |
| | $H_2SiO_3$ | 3 | −200 | | | | | | | |
| T-4 | $B_4Si$ | 1 | −200 | " | " | " | " | " | 82.1 | " |
| | Ti-metal | 4 | −325 | | | | | | | |
| T-5 | $VB_2$ | 3 | −325 | " | " | " | " | " | 81.9 | " |
| | $H_2SiO_3$ | 7 | −200 | | | | | | | |

Notes:
1. Processing by means of Method G using maximum cure temperatures listed above.
2. ZC-5 binder mixed with water in a 1:2 ratio by volume. Slurry with binder added was evacuated to remove air bubbles and thoroughly wet all grains of basic formulation. See Table IV for binder details.
3. All coatings applied by means of small brush.
4. All substrates ⅛ to 5/18" in thickness.
5. Samples 20-1 through T-5 above were heated to 900°F and quenched in ambient temperature water. All coatings survived without cracking or other type failure.
NM* = Not Measured After the coating is applied it is left to air dry before being placed in a 350°F oven for the beginning of the cure cycle. The maximum cure temperature used for each sample is listed in the table. A typical initial bonding cure cycle would be 15–20 minutes at 350°F, 700°F, 900°F and 1250°F, respectively.

Following this first cure cycle, when the initial bond is established to the substrate as well as between the grains or particles comprising the coating, further chromium oxide bonding, densification and hardening is accomplished using our multiple impregnation-cure cycle method. All samples in Table XXIII were processed using Method G which is identical to H except:

Method G

Same as H except:
c. Impregnation cycle:
    5 min. under solution at 95 psig
    10 min. under solution at 0 psig (ambient pressure)

Because of the heating cycle required to establish a bond between the coating and substrate, it is important that a reasonably good thermal expansion match between the two exist. For this reason it is often difficult to apply certain materials to a specific substrate. This can often be overcome in a practical sense by adding a high or a low expansion rate material to the slurry formulation. For example a low expansion rate grain such as silicon carbide could be added to a relatively high expansion rate material such as zirconium oxide in the approximately correct proportions to match a substrate such as titanium metal which has a thermal expansion rate somewhere between the two. Since most commonly used metals such as steel, stainless steel, bronze, aluminum and nickel alloys have a relatively high expansion rate compared to most refractory materials, it has often been necessary to find a high expansion rate additive in many practical coating applications. One such additive found to have relatively high thermal expansion properties is a natural mined product sold by Central Scientific Company as a "technical grade" silicic acid. X-ray difraction studies have shown that this in an imperfectly crystalized chalcedony or flint. This has been listed as $H_2SiO_3$ in Table XXIII.

Greater coating-to-substrate thermal expansion mismatches can also be tolerated when the slurry has a high percentage of a somewhat ductile material such as a metal powder. Grit blasting the surface of the substrate also often helps in cases where a thermal mismatch is present. Some of the samples in Table XXIII have a grit blasted surface and others are smooth as indicated under the heading "Surface Preparation". Specimens 20-1 through 20-10 were lightly grit blasted followed by a very thin nickel flash plating. In this case the chrome oxide bond to the coating is being made to the nickel oxide layer that forms on the plating rather than to the steel substrate.

been added as an oxidizing agent. An excess of ferrous oxalate was added so that the solution was fully concentrated at all times. The steel discs were suspended on wires in the boiling solution for about 20 minutes after which time a yellowish grey oxalate deposit about 0.002 inch thick had built up on the surfaces. The oxalate coated discs were then placed in an oven at either 350°F or 500°F. Heating at 350°F did not convert the oxalate but did apparently remove excess water because of a noted color change to yellow. The samples heated to 500°F turned to a red color indicating a conversion of the iron oxalate coating to iron oxide of the $Fe_2O_3$ form. As can be seen in Table XXIV some of these samples were measured on the 25g Vickers scale and showed that considerable hardness had been achieved.

TABLE XXIV

CHROMIUM OXIDE DENSIFIED, BONDED & HARDENED OXALATE COATINGS ON 1020 STEEL

| Sample No. | Porous Type Ovalate Coating | Substrate | Pre-Impregnation Heat Cycle | Impregnation Liquid | Number of Cure Cycles | Maximum Cure Temperature | 25g Vickers Hardness | 900°F to Ambient $H_2O$ Quench |
|---|---|---|---|---|---|---|---|---|
| 1 | Kaman Ferrous Oxalate Bath | 1020 Steel | 350°F | ZC-2 | 1× | 900°F | NM* | No Coating Failure |
|   |   |   |   | C-1.7 | 2-13× | 900°F |   |   |
| 2 | " | " | " | CRC-2 | 13× | 900°F | 1331 | " |
| 3 | " | " | 500°F | " | " | " | NM* | " |
| 4 | " | " | " | C-1.7 | " | " | 706 | " |
| 5 | " | " | " | CRC-2 | 1× | 900°F | NM* | " |
|   |   |   |   | " | 2-13× | 1200°F |   |   |
| 6 | " | " | " | C-1.7 | 1× | 900°F | 2757 | " |
|   |   |   |   | C-1.7 | 2-13× | 1200°F |   |   |
| 7 | " | " | " | CRC-2 | 3× | 900°F | NM* | " |
|   |   |   |   | " | 4-13× | 1200°F |   |   |
| 8 | " | " | " | C-1.7 | 3× | 900°F | 2628 | " |
|   |   |   |   | " | 4-13× | 1200°F |   |   |
| 9 | " | " | " | ZC-5 | 3× | 900°F | 2507 | " |
|   |   |   |   | C-1.7 | 4-13× | 1200°F |   |   |
| 10 | " | " | 350°F | ZC-2 | 1× | 900°F | NM* | " |
|   |   |   |   | C-1.7 | 2-13× | 1200°F |   |   |
| 2-6 | Hooker Ferrous Oxalate Bath | " | 500°F | C-1.7 | 1× | 900°F | 1287 | " |
|   |   |   |   | " | 2-13× | 1200°F |   |   |
| A | Kaman Titanium Oxalate Bath | " | " | CRC-2 | 13× | 900°F | NM* | " |
|   |   |   |   | C-1.7 | 3× |   |   |   |
| B | " | " | " | C-1.7 | 4-13× | 900°F 1200°F | 2628 | " |

Notes:
1. Sample size, ⅞" diameter × .050" thick, coated and densified all surfaces.
2. Processing per Method G using maximum temperature(s) listed above.
3. Oxalate coated discs were heated to temperature indicated prior to initial impregnation cure cycle.
4. Impregnating liquids ZC-2, C-1.7 and CRC-2 are described in more detail in Table IV. CRC-2 was used mixed with water in a ratio of 3:1 by volume.
NM* = Not Measured In addition to slurry type coatings, a number of other systems have been found to be feasible and very useful. These include the processing of inherently porous coatings such as oxalate coatings formed on steel, black iron oxide on steel, conversion or electrolytically formed coatings on titanium, anodized aluminum and hard chrome plating where the microcracks and porosity can be filled and bonded. In effect, these coating systems are similar to the processing of pre-formed bodies initially bonded by other than a chromium oxide bond as described in Section 1. It should be pointed out, however, that the chromium oxide processing in the case of these pre-formed coatings also greatly enhance the bond to the substrate in addition to the densification, hardening and strengthening of the porous layer itself.

Table XXIV covers test specimens employing oxalate coatings on steel discs subsequently chromium oxide densified, bonded and hardened. Discs numbered 1 through 9 were prepared by first etching in a nitric acid bath (6 parts $H_2O$) to 1 part concentrated $HNO_3$ by volume). After thoroughly rinsing they were placed in a boiling solution of ferrous oxalate ($FeC_2O_4 \cdot 2H_2O$) to which about 1-2% of concentrated chromic acid had All of the oxalate coatings were quite soft and could be scratched with the fingernail prior to the chromium oxide multiple cycle treatment.

Processing was done using Method G, except that the cure cycles were limited to 10 minutes at each temperature. These particular samples were only ⅞ inch diameter × 0.050 inch in thickness. The maximum cure temperature used is listed in the figure along with the impregnants employed. These included chromic acid (C-1.65), zinc chromate-chromic acid solutions (ZC-2 and ZC-5 ) and a complex chromium compound (CRC-2) which is made by reacting chromic acid with carbon. This latter was used mixed with water in the ratio of 3:1 by volume.

Sample 2-6 also included in Table XXIII was prepared in the same general way as samples 1-9 above except that the coating was applied using a commercial iron oxalate bath known as Hooker Ferrous Oxalate Bath sold by The Hooker Chemical Division Corporation. Samples A and B in Table XXIII were also similar but used a titanium oxalate coating deposited by substituting titanium oxalate for ferrous oxalate in the bath described earlier for Samples 1-9. Sample B in particular showed a high degree of hardness after the 13 impregnation-cure cycles. It is assumed that the titanium oxalate coating converted to titanium oxide either during the preliminary 500°F heating cycle or the subsequent 900°F cycle when the chromium impregnant was cured.

Table XXV shows a different variation where 1020 steel alloy discs have been coated with a commercial black iron oxide ($Fe_3O_4$) coating.

and bonding process. Processing with multiple impregnation-cure cycles using chromic acid, complex chromium compounds ($xCrO_3 \cdot yCr_2O_3 \cdot zH_2O$), or chromate-chromic acid mixtures have all provided very hard and dense coatings after a number of treatments. The same basic method has been used to densify and bond chromium oxide coatings that were formed on a high chromium alloy metal in a controlled atmosphere.

TABLE XXV

CHROMIUM OXIDE DENSIFIED, BONDED & HARDENED BLACK IRON OXIDE COATINGS ON STEEL

| Sample No. | Coating System | Substrate | Pre-Impregnation Heat Cycle | Impregnating Liquid | Number of Cure Cycles | Maximum Cure Temperature | 0× | 50g Knoop Hardness | | | |
|---|---|---|---|---|---|---|---|---|---|---|---|
| | | | | | | | | 5× | 9× | 10× | 13× |
| PBO-0 | Parker Black Iron | 1020 Steel | None | None | None | None | 464 | | | | |
| PBO-7 | " | " | 750°F | CRC-2 + $H_2O$ (3:1) | 750°F | 750°F | NM | 678 | NM | 785 | 801 |
| PBO-9 | " | " | 900°F | " | 900°F | 900°F | NM | 801 | 759 | NM | NM |

Notes:
1. 1020 steel discs were 1½" diameter × ¼" thick and were black iron coated all over using a commercially available black iron oxide bath available from the Parker Corporation.
2. Processing was by means of Method G using maximum cure temperatures indicated above.
3. The CRC-2 impregnant was mixed with water in the ratio of 3:1 by volume.
4. Knoop hardness values may be erroneous due to "see through" effect of 1020 steel substrate directly beneath the very thin coated and densified layer.

Subsequent chromium oxide densification and bonding resulted in an increase in coating hardness. It should be noted that the black iron oxide coating used could not be applied to a thickness greater than about 0.00025 inch so that the 50g Knoop hardness values listed in Table XXV may be lower than actual values because of the influence of the softer substrate directly beneath the very thin coating. The coated discs were pre-heated prior to processing at temperatures listed in the table to remove any water and convert into a porous coating prior to the chromium oxide densification and bonding process. The coatings, originally black at room temperature, changed to a bright red at 750°F indicating a conversion from $Fe_3O_4$ to $Fe_2O_3$. The chromium oxide processing is therefore being applied to the $Fe_2O_3$ rather than the black $Fe_3O_4$ coating. Impregnation was by means of CRC-2 and the same Method G process variations as used for the parts just described in Table XXIV.

Another method for forming coatings involves the acid etching and oxidation of the etched surface. This method has been used with steel with excellent success and simply involves etching the surface of the steel with an acid such as nitric or hydrochloric and then placing the etched parts (after water rinsing) in a furnace and heating to a temperature of between 600° and 1000°F in an air atmosphere. The heating causes some of the finely etched metal to oxidize which forms a porous layer highly suitable for the chrome oxide densification Again the coating became very hard after a few cycles.

Table XXVI shows 25 gram Vickers hardness values for some electrolytically applied titanium oxide based coatings applied to titanium metal. This is a proprietary coating system of Pratt and Whitney Div. of United Aircraft. Again, the chromium oxide processing resulted in a noticeable increase in hardness after several cycles. Best results were found by first heating the coated parts to 1200°F prior to starting the multiple chromium compound impregnation-cure cycles. This opens up additional interconnected porosity within the specially coated surface allowing more chromium oxide densification and better bonding to the substrate than is possible without the pre-heating. Two additional types of coatings applied to titanium have been similarly densified with substantial hardness increases. These were non-electrolytically applied proprietary coatings produced by Titanium Processors, Inc. and an electrolytically applied coating system developed by Watervliet Arsenal.

Anodized aluminum coatings are another interesting, commercially available system that lends itself to improvement in density and hardness by our multiple cycle process. Some of the hardness results obtained after 9 or 13 impregnation-cure cycles are shown in Table XXVII. Processing was again by Method G but the maximum cure temperatures were limited to 900°F or less because of the relatively low melting point of the 6061 aluminum alloy substrate.

TABLE XXVI

CHROMIUM OXIDE DENSIFIED, BONDED & HARDENED ELECTROLYTICALLY APPLIED COATINGS ON TITANIUM METAL ALLOY

| Sample No. | Coating System | Substrate | Pre-Impregnation Heat Cycle | Impregnating Liquid | Number of Cure Cycles | Maximum Cure Temperature | 25g Vickers Hardness |
|---|---|---|---|---|---|---|---|
| 1 | P&W Electrolytic coating | Titanium 6Al-4Valley | 1200°F | CRC-2 + $H_2O$ (3:1) | 10× | 1200°F | 1426 |

TABLE XXVI-continued

CHROMIUM OXIDE DENSIFIED, BONDED & HARDENED ELECTROLYTICALLY APPLIED COATINGS ON TITANIUM METAL ALLOY

| Sample No. | Coating System | Substrate | Pre-Impregnation Heat Cycle | Impregnating Liquid | Number of Cure Cycles | Maximum Cure Temperature | 25g Vickers Hardness |
|---|---|---|---|---|---|---|---|
| 2 | '' | '' | '' | C-1.65 | '' | 1200°F | 1478 |

Notes:
1. Sample sizes were strips ~½" × 6" × .030".
2. Processing per Method G using maximum temperature listed for each impregnation-cure cycle.
3. Impregnating liquids CRC-2 and C-1.65 are described in Table IV. The CRC-2 was used mixed with water in the ratio of 3:1 by volume.
4. The initial coated strips were prepared by Pratt & Whitney Division of United Aircraft using their proprietary process. The coating as received was a greyish-violet color and had a thickness of about .003".

TABLE XXVII

CHROMIUM OXIDE DENSIFIED, BONDED AND HARDENED HARD ANODIZED COATINGS ON ALUMINUM METAL

| Sample No. | Coating System | Substrate | Anodized Thickness | Pre-Impregnation Treatment | Impregnating Liquid | Number of Cure Cycles | Maximum Cure Temperature | 25g Vickers Hardness |
|---|---|---|---|---|---|---|---|---|
| AN-17 | Hard Anodized | 6061 Aluminum | ~.002" | Methanol soak 30 min. | CRC-2 + $H_2O$ (3:1) | 9× | 750°F | 1287 |
| AN-18 | '' | '' | '' | '' | CRC-2 + $H_2O$ (3:1) | 9× | 900°F | 1355 |
| AN-19 | '' | '' | '' | '' | CRC-2 (3:1) C-1.7 | 3× 4-9× | 900°F 900°F | 1532 |
| AN-21 | '' | '' | '' | Conc. HCl soak 10 min. | CRC-2 + $H_2O$ (3:1) | 9× | 750°F | 1478 |
| AN-22 | '' | '' | '' | '' | CRC-2 + $H_2O$ (3:1) | 9× | 900°F | 1478 |
| AN-23 | '' | '' | '' | '' | CRC-2 (3:1) C-1.7 | 3× 4-9× | 900°F 900°F | 1331 |
| AN-24 | '' | '' | '' | Conc. $H_2SO_4$ Soak 10 min. | CRC-2 + $H_2O$ (3:1) | 9× | 750°F | 1507 |
| AN-25 | '' | '' | '' | '' | CRC-2 + $H_2O$ (3:1) | 9× | 900°F | 1930 |
| AN-27 | '' | '' | '' | '' | CRC-2 (3:1) C-1.7 | 3× 4-9× | 900°F 900°F | 1615 |

Notes:
1. Sample size, coated all over is 1½" diameter × ¼" thick.
2. Processing per method G using maximum cure temperature listed above.
3. Impregnating liquids CRC-2 and C-1.7 are described in detail in Table IV. CRC-2 was mixed with water in the ratio of 3:1 by volume.
4. Hard anodized coatings were applied by a local plater and specified no final sealing such as boiling in $H_2O$.

In all cases the hardness values were too low to measure prior to the chrome oxide processing.

Best results have been obtained by a pre-treatment of some type to remove water to hydration from the anodized coating. This may consist of pre-heating at an elevated temperature, soaking in concentrated hydrochloric or sulphuric acid or even reagent grade methanol. For this same reason the anodized coatings should not be boiled in water or otherwise subjected to a so-called "sealing" process as is often done in commercial anodizing as the final processing step.

Impregnating liquids used in Table XXVII include the complex chromium compound (CRC-2) used with water in the ratio of 3:1 by volume and chromic acid (C-1.65). Best results with the densification, bonding and hardening of anodized aluminum have been made using an impregnant such as CRC-2 for at least a few cycles. Using a highly acedic solution such as chromic acid tends to cause peeling of the anodized layer, probably due to an attack of the aluminum substrate through the porous anodized layer.

The anodized aluminum surfaces described above and in Table XXVII utilize the so-called "hard" anodize method. We have also successfully processed other commercially available anodized aluminum surfaces, namely, those employing standard "sulphuric" and "chrome" baths. All three methods cause the formation of an aluminum oxide surface on the aluminum substrate. The coatings from the sulphuric and chrome baths usually are thinner and less hard than those produced by the hard anodize process.

All three of these types of commercial anodized coatings have been checked for corrosion resistance using both concentrated hydrochloric acid and sodium hydroxide (3 Normal) solutions. The test consisted simply of placing drops of the solutions on the surface of the coated samples and observing the length of time required for the formation of gas bubbles indicating an attack of the aluminum metal substrate. For all cases the chromium oxide processing significantly improved the resistance to both the acid or base. The hard anodized surfaces, after 7 or more impregnation cure cycles (using CRC-2 as the impregnant) were found to be especially resistant to such chemical attack.

A departure from the processing of porous oxide surfaces is the chromium oxide densification of electroplated metal surfaces. Perhaps the system of greatest importance is the application of our process to chromium metal plating, especially to the type of plating sold as hard chrome. Chromium plating has an inherent problem of porosity. This takes the form of microcracks, often called "chicken wire crazing" that become more pronounced and visible as the plating thickness is increased. We have found that multiple impregnation-cure cycles with our chromium oxide process not only densifies the microcracked plating but also improves the bond to the substrate, greatly reduces flaking and in most cases provides increased hardness even beneath the surface.

Table XXVIII shows test data obtained from a group of chromium oxide processed, hard chrome plated steel discs using chromic acid or CRC-2 as the impregnant.

and with a hydraulic test where hydraulic fluid leak rates were measured.

Additionally, a number of samples were made from 0.030 inch thick 1020 steel sheet stock, plated with ~0.001 inch of hard chrome plate, and tested for plating-to-substrate adhesion and/or flaking. The tests were

TABLE XXVIII

CHROMIUM OXIDE DENSIFICATION, BONDING AND HARDENING OF HARD CHROMIUM ELECTROPLATED SURFACES

| Sample No. | Coating System | Substrate | Plated Thickness | Pre-Impregnation Treatment | Impregnating Liquid | Number of Cure Cycles | Maximum Cure Temperature | 25g Vickers Hardness | Helium Leak Test (Standard He/sec) |
|---|---|---|---|---|---|---|---|---|---|
| 10 | Electroplated Hard Chrome | 1020 Steel | ~.0025" | None | C-1.7 | 9× | 750°F | 1782 | <$10^{-9}$ |
| 11 | " | " | " | " | " | " | 900°F | 2190 | Not |
| 12 | " | " | " | Conc. HCl Soak 10 min. | " | " | 900°F | 2012 | Measured " |
| 13 | " | " | " | None | CRC-2 | " | 750°F | 1532 | " |
| 14 | " | " | " | " | " | " | 900°F | 1930 | " |
| 15 | " | " | " | " | None | " | 750°F | 1714 | Gross Leaks |

Notes:
1. All samples given a 750°F heat cycle prior to processing to remove any vestige of plating solution, finger grease, etc.
2. All samples were lapped to remove ~.0003" of hard chrome plate after 9 impregnation-cure cycles prior to making hardness measurements and helium leak tests.
3. Processing per Method G - using maximum cure temperatures listed above.
4. Impregnation liquids are described in more detail in Table IV.
5. All helium leak-tested samples were cleaned in hot trichlorethylene and heated to 750°F for approximately one hour before testing to remove any possible vestage of lapping oil.

Plated thickness after finishing was about 0.002 inch. All samples were heated to 750°F prior to processing to remove plating solution, finger prints, etc. from the microcracks or pores of the plating. The first three samples listed (00,66 and 101) were measured for hardness at 5, 9 and 13 impregnation-cure cycles without lapping. Samples 10 through 15 were lapped so as to remove approximately 0.0003 inch of the plated surface. This effectively removed the very thin chromium oxide layer that had built up on the plated surface during the processing. Sample 15 is a non-processed control disc from the same lot included for measurement comparison purposes. Samples 10 through 14 were measured for hardness after nine impregnation-cure cycles and after lapping. A significant increase in hardness over the non-densified Sample 15 is noted for all samples processed at 900°F.

Samples 10 and 15, processed to 750°F, were also checked for leakage using a helium leak detector. The measurements were made by clamping the lapped disc against a clean, non-greased Viton O-ring seal placed on the leak detector evacuation plate. These two samples were also cleaned in hot tri-chlorethylene and then heated at 750°F for about 2 hours to remove all oil and solvent after lapping. It can be seen from the figure that Sample 10, chrome oxide processed for 9 cycles, has a leak rate of less than $10^{-9}$ standard cc of helium per second, while the non-densified control Sample 15 showed "gross leaks". By gross leaks it is meant that the leak detector could not be evacuated to a point where helium gas could be introduced into the detector to make a measurement. Additional leak tests of non-processed vs. chromium oxide porcessed hard chrome plated samples have confirmed that the interconnected microcracks are indeed sealed to a marked degree after several impregnation-cure cycles. These have been made with the helium leak detector method described above as well as with other methods. These consisted of a pressurized (200–3000 psi) helium leak method where gas bubbles are detected visually under water made using a simple bending test or an automatic centerpunch test (pre-set to a given impact level). A microscopic examination of the cracks extending from the overstressed plating area after bending or denting was then made. In all cases a marked lessening of cracks and a much less extensive area of plating removed from the overstressed areas was noticed in virtually all cases for the chromium oxide processed specimens as compared to the non-processed specimens. Processed samples in these tests were prepared with 7, 9 or 11 impregnation-cure cycles and the results indicate that a bond is being established within the plating microcracks and the chromium oxide deposited therein. Scanning electron microscope studies have been made of sectioned samples that show that the microcracks are indeed being filled with chromium oxide. The successful use of chromium impregnants for chromium plating processing other than chromic acid or CRC-2 is logically anticipated based on the processing results of other porous bodies and coatings described elsewhere in this disclosure.

Finally, some preliminary tests have been made that show that chromium oxide processed plated parts show significantly improved salt water corrosion resistance properties as compared to non-processed parts. Processing in one instance involved eleven impregnation-cure cycles using chromic acid (~1.65 s.g.) as the impregnant. The processing was done following Method G with a maximum cure cycle of 900°F. The parts were commercially produced steel center punches obtained directly from the plater and were from the same plated lot. Plating was approximately 0.00002 inch of chrome over 0.0003 inch of bright nickel. The testing was done by supporting the punches about 1 inch above an aerated tank of salt water kept at room temperature. This caused a constantly changing mist to settle on the surfaces of the parts. After 8 hours rust spots began to show on the non-treated sample. The test was stopped after two weeks at which time there were several badly corroded areas extending through the plating of the non-treated punch and no visible corrosion in the treated part.

Another somewhat different coating system involves the use of substrates without a pre-formed porous layer. In this special case the porous layer is established coincidentally with the multiple cycle densification and bonding process. More specifically, it has been found that very thin chromium oxide (or chromite-chromium oxide) layers can be established which, after a sufficient number of impregnation-cure cycles, will become extremely hard, dense, and well bonded to the substrate. The chromium compounds that have been found suitable for this system include chromic acid, the complex chromium compounds of the generalized form. $XCrO_3 \cdot yCr_2O_3 \cdot zH_2O$ and metal chromate-chromic acid mixtures. When used to coat metal surfaces the metal is first cleaned by such means as acid etching, electrolytic or chemical cleaning or grit blasting prior to the first impregnation-cure cycle. The first few impregnation cycles are generally made by simply dipping the part in the impregnant. After the surface layer begins to build up and becomes more dense it is then often desirable to switch to a pressure impregnation method such as Method G.

Coatings of this type have been successfully applied to a wide variety of metals and non-metals. Those that have provided extremely hard (Moh's hardness>9) include: 416, 316 and 17-4PH stainless steel; stellite complex chromium compound solution (CRC-2) mixed 3 parts to 1 part by volume with water. Processing was by means of Method G and the maximum cure temperature was 1200°F.

Another process variation is the densification, bonding and hardening of metal and non-oxide refractory (or mixtures thereof) coatings applied to metal or other substrates by means of flame spray, plasma spray, or detonation processes. For example, porous plasma sprayed aluminum nitride coatings (often used as an undercoating for flame and plasma sprayed coatings) has been densified using ~1.65 specific gravity chromic acid solution. After 13 impregnation-cure cycles it was found to be very dense and have Rockwell hardness measurements greater than 15N-70. Prior to processing the coating was too porous and/or soft to read on the 15N scale.

Another system that also appears feasible is the chromium oxide processing of electrophoretically applied metal and refractory coatings.

From the foregoing disclosures, a wide number of possible coating systems will be obvious to those skilled in the art. The primary criteria is that a surface with interconnected porosity be first established on the substrate that can then be impregnated with a suitable chromium impregnant without destroying the coating surface and that can be subsequently heat cured to form a chromium oxide.

TABLE XXIX

THIN BUILT-UP CHROMIUM OXIDE COATINGS ON TITANIUM SUBSTRATES

| Sample No. | Substrate | Substrate Surface Preparation | Impregnating Liquid | Number of Cure Cycles | Maximum Cure Temperature | 25g Vickers Hardness |
|---|---|---|---|---|---|---|
| 3–4 | Titanium 6Ai-4Valloy | Light $H_2SO_4$ Acid Etch | C-1.65 | 11× | 1200°F | 1378 |
| 5–6 | " | " | " | 13× | " | 1589 |
| 9–10 | " | " | CRC-2 + C-1.65 | 3× 4×–11× | " | 1300 |
| 11–12 | " | " | " | 3× 4×–13× | " | 2827 |

Notes:
1. Samples were 1½" diameter × ¼" thick.
2. Acid etching was done in a heated, concentrated $H_2SO_4$ bath to give a fine frosted surface finish. Parts were then washed and dried before processing.
3. Processing was by means of Method G using maximum cure temperatures listed above.
4. Impregnants are described in more detail in Table IV.

(both nickel and cobalt based types); Monel; Inconel; Incramet, naval bronze, and other bronze alloys; aluminum oxide; boron carbide-silicon carbide alloyed material; pyroceram; etc.

Hardness measurements of these very thin coatings have often been difficult to make, especially where they are applied over relatively soft substrates. Most such measurements, therefore have been limited to scratch tests using tungsten carbide or silicon carbide points. In this case Moh's values of greater than 9 are invariably measured for chromium oxide (or chromate-chromium oxide) coatings prepared in this manner whenever about 10 to 13 impregnation-cure cycles have been employed. Tests with acid over easily attacked substrates also show that the coatings have normally become very dense and impervious with such numbers of cure cycles. Some of these coatings have also been measured using the Vickers micro-hardness tester.

Table XXIX shows such Vickers hardness measurements made on coated titanium specimens processed using repeated impregnation-cure cycles. Samples 1 through 6 used a 1.65 specific gravity chromic acid (C-1.65) for all cycles. Samples 7 through 12 used a In summary it should be stated that only acidic or acidified chromium compounds have been found suitable for use in forming well bonding coatings. Densification will of course occur with neutral or basic compounds with prebonded coatings (such as flame and plasma sprayed types) but increased bonding is not noticeable. Also, chromium compounds such as chromium chloride, nitrate, acetate, sulfate, and the like, although admittedly acidic in nature, have not been found to be particularly successful in establishing coatings well bonded to the substrate. Only the chromic acid or the complex chromium compounds of the general type $xCr_2O_3 \cdot yCrO_3 \cdot zH_2O$) or metal chromate-chromic acid mixtures have been found to make good impregnants where a strong coating-to-substrate bond is desired.

What is claimed is:

1. The method of densifying, hardening and strengthening of bodies and coatings having interconnected porosity which comprises the steps of:
    impregnating a porous body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body, wherein the body consists of a material which is comprised of an oxide; is insoluble in and non-adversely reactive with the solution of a chromium compound selected as an impregnant; and is inherently temperature stable to at least the minimum heat cure temperature employed in converting the chromium compound impregnant to chromium oxide wherein the chromium compound is a mixture of chromic acid and a chromate.

2. The method of densifying, hardening and strengthening of bodies and coatings having interconnected porosity which comprises the steps of:

impregnating a porous body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body, wherein the body consists of a material which is comprised of an oxide; is insoluble in and non-adversely reactive with the solution of a chromium compound selected as an impregnant; and is inherently temperature stable to at least the minimum heat cure temperature employed in converting the chromium compound impregnant to chromium oxide wherein the chromium compound is chromic acid comprising chromium trioxide dissolved in water to provide a specific gravity of about 1.65.

3. The method of densifying, hardening and strengthening of bodies and coatings having interconnected porosity which comprises the steps of:

impregnating a porous body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body, wherein the body consists of a material which is comprised of an oxide; is insoluble in and non-adversely reactive with the solution of a chromium compound selected as an impregnant; and is inherently temperature stable to at least the minimum heat cure temperature employed in converting the chromium compound impregnant to chromium oxide wherein the chromium compound is chromic acid comprising chromium trioxide dissolved in water with excess chromium trioxide added to provide a specific gravity of about 1.7.

4. The method of forming, densifying, hardening and strengthening of bodies having interconnected porosity which comprises the steps of:

forming a porous body of a material which is comprised of an oxide; is insoluble in or non-adversely reactive with the solution of chromium compound selected as an impregnant; and is inherently temperature stable to at least the minimum heat cure temperature employed in converting the chromium compound impregnant to chromium oxide;

impregnating the formed body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body wherein the chromium compound is a mixture of chromic acid and a chromate.

5. The method of forming, densifying, hardening and strengthening of bodies having interconnected porosity which comprises the steps of:

forming a porous body of a material which is comprised of an oxide; is insoluble in or non-adversely reactive with the solution of chromium compound selected as an impregnant; and is inherently temperature stable to at least the minimum heat cure temperature employed in converting the chromium compound impregnant to chromium oxide;

impregnating the formed body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body wherein the chromium compound is chromic acid reduced by a reducing agent selected from the group consisting of tartaric acid, carbon, and formic acid.

6. The method of forming, densifying, hardening and strengthening of bodies having interconnected porosity which comprises the steps of:

forming a porous body of a material which is comprised of an oxide; is insoluble in or non-adversely reactive with the solution of chromium compound selected as an impregnant; and is inherently temperature stable to at least the minimum heat cure temperature employed in convertng the chromium compound impregnant to chromium oxide;

impregnating the formed body with a solution of a soluble chromium compound capable of being converted to a chromium oxide on being heated;

drying and curing said impregnated body by heating same to a temperature sufficient to convert the chromium compound in situ to chromium oxide; and, repeating the impregnation and curing steps at least once to densify, harden and strengthen the body wherein the chromium compound is chromic acid having dissolved therein a compound selected from the group consisting of $Cr_2O_3 \cdot zH_2O$, $Cr_2O_3$ and chromium hydroxide.

7. The method of forming, densifying, hardening and strengthening of bodies having interconnected porosity which comprises the steps of:

forming a porous body of a material which is comprised of an oxide; is insoluble in or non-adversely reactive with the solution of chromium compound selected as an impregnant; and is inherently temperature stable to at least the minimum heat cure temperature employed in converting the chromium compound impregnant to chromium oxide;

impregnating the formed body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body wherein the chromium compound is a reaction product of chromic acid and an oxide selected from the group consisting of magnesium and zinc oxides.

8. The method of forming, densifying, hardening and strengthening of bodies having interconnected porosity which comprises the steps of:

forming a porous body of a material which is comprised of an oxide; is insoluble in or non-adversely reactive with the solution of chromium compound selected as an impregnant; and is inherently temperature stable to at least the minimum heat cure temperature employed in converting the chromium compound impregnant to chromium oxide;

impregnating the formed body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body wherein the material from which the body is formed is particulate and has an amount of the chromium compound mixed therewith prior to forming sufficient to provide chromium compound at each point of contract between the particulate material.

9. The method of densifying, hardening and strengthening of bodies and coatings having interconnected porosity which comprises the steps of:

impregnating a porous body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body, wherein the body consists of a material which is comprised of an oxide; is insoluble in and non-adversely reactive with the solution of a chromium compound selected as an impregnant; and is inherently temperature stable to at least the minimum heat cure temperature employed in converting the chromium compound impregnant to chromium oxide wherein the chromium compound is a mixture of chromic acid and a chromate selected from the group consisting of magnesium and zinc.

10. The method of forming, densifying, hardening and strengthening of bodies having interconnected porosity which comprises the steps of:

forming a porous body of a material which is comprised of an oxide; is insoluble in or non-adversely reactive with the solution of chromium compound selected as an impregnant; and is inherently temperature stable to at least the minimum heat cure temperature employed in converting the chromium compound impregnant to chromium oxide;

impregnating the formed body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body wherein the chromium compound is a chromate selected from the group consisting of magnesium and zinc.

11. The method of forming, densifying, hardening and strengthening of bodies having interconnected porosity which comprises the steps of:

forming a porous body of a material which is comprised of an oxide; is insoluble in or non-adversely reactive with the solution of chromium compound selected as an impregnant; and is inherently temperature stable to at least the minimum heat cure temperature employed in converting the chromium compound impregnant to chromium oxide;

impregnating the formed body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body wherein the chromium compound is of the general formula $xCrO_3 \cdot yCr_2O_3 \cdot zH_2O$.

12. The method of densifying, hardening and strengthening of bodies and coatings having interconnected porosity which comprises the steps of:

impregnating a porous body with a solution of a soluble chromium compound capable of being converted to chromium oxide on being heated;

drying and curing said impregnated body by heating same to a temperature sufficient to convert the chromium compound in situ to chromium oxide; and, repeating the impregnation and curing steps at least once to densify, harden and strengthen the body, wherein the body consists of a material which is comprised of an oxide; is insoluble in and non-adversely reactive with the solution of a chromium compound selected as an impregnant; and is inherently temperature stable to at least the minimum heat cure temperature employed in converting the chromium compound impregnant to chromium oxide wherein the chromium compound is of the general formula $xCrO_3 \cdot yCr_2O_3 \cdot zH_2O$.

13. The method of claim 12 wherein the chromium compound is chromic acid having dissolved therein a compound selected from the group consisting of $Cr_2O_3$; $Cr_2O_3 \cdot xH_2O$; and, chromium hydroxide.

14. The method of claim 13 wherein the chromium compound is chromic acid having chromium oxide dissolved therein to provide a specific gravity of about 1.84 which is then diluted about 3 parts chromium solution to 1 part water.

15. The method of claim 12 wherein the chromium compound is chromic acid reduced by a reducing agent selected from the group consisting of tartaric acid, carbon, and formic acid.

16. The method of claim 15 wherein the chromium compound is chromic acid having an amount of carbon dissolved therein sufficient to provide a specific gravity of about 1.7.

17. The method of claim 16 wherein the carbon is dissolved in the chromic acid with a ratio of about 9 parts by weight of carbon to about 340 parts by weight of chromium trioxide.

18. The method of claim 16 wherein the carbon is dissolved in the chromic acid with a ratio of about 210 parts by weight of carbon to about 1812 parts by weight of chromium trioxide.

19. The method of forming, densifying, hardening and strengthening of bodies having interconnected porosity which comprises the steps of:
forming a porous body of a material which is comprised of materials selected from the group consisting of nitrides, carbides, silicides, silicates, titanates, stannates, zirconates, borides, intermetallics, ferrites, metals, metal alloys, oxides, complex oxides and mixtures thereof; is insoluble in or non-adversely reactive with the solution of chromium compound selected as an impregnant; and is inherently temperature stable to at least the minimum heat cure temperature employed in converting the chromium compound impregnant to chromium oxide;
impregnating the formed body with a solution of a soluble chromium compound capable of being converted to chromium oxide on being heated;
drying and curing said impregnated body by heating same to a temperature sufficient to convert the chromium compound in situ to chromium oxide; and, repeating the impregnation and curing steps at least once to densify, harden and strengthen the body.

20. The method of claim 19 wherein the bodies are comprised of materials selected from the group consisting of silicon carbide, silicon nitride, boron carbide, molybdenum silicide, zirconium silicate, calcium titanite, magnesium stannate and cesium zirconate.

21. The methods of claim 19 wherein the chromium compound is a chromic acid.

22. The method of claim 19 wherein the soluble chromium compound is an acidic chromium compound.

23. The method of claim 19 wherein the material from which the body is formed is a slurry of finely divided particles in a liquid which is applied to a substrate to form a coating thereon.

24. The method of claim 23 wherein the slurry is comprised of a mixture of particles of a relatively low expansion rate material and particles of a relatively high expansion rate material in such proportions as to provide a combined expansion rate substantially matching the substrate to which the slurry is applied.

25. The method of claim 23 wherein the slurry includes an amount of a ductile metal powder sufficient to tolerate substantial thermal expansion mismatches between the substrate and the cured coating.

26. The method of claim 19 wherein the porous body is a porous coating formed on a substrate wherein the porous bodies are comprised of an in situ oxide coating on stainless steel; stellite; ⅔ nickel ⅓ copper alloy; 78% nickel, 15% chromium, 6% iron alloy; navel bronze and bronze alloys; and boron carbidesilicon carbide alloyed material.

27. The method of claim 26 wherein the coating is iron oxalate.

28. The method of claim 26 wherein the coating is iron oxide.

29. The method of forming, densifying, hardening and strengthening of bodies having interconnected porosity which comprises the steps of:
forming a porous body of a material which is comprised of an oxide; is insoluble in or non-adversely reactive with the solution of chromium compound selected as an impregnant; and is inherently temperature stable to at least the minimum heat cure temperature employed in converting the chromium compound impregnant to chromium oxide;
impregnating the formed body with a solution of a soluble chromium compound capable of being converted to chromium oxide on being heated;
drying and curing said impregnated body by heating same to a temperature sufficient to convert the chromium compound in situ to chromium oxide; and, repeating the impregnation and curing steps at least once to densify, harden and strengthen the body where the porous body is a porous coating electrolytically formed on a substrate.

30. The method of claim 29 wherein the coating is anodized aluminum.

31. The method of claim 29 wherein the coating is titanium oxide.

32. The method of claim 29 wherein the coating is chrome plating.

33. The method of claim 32 wherein the chromium compound is chromic acid.

34. The method of densifying, hardening and strengthening of bodies and coatings having interconnected porosity which comprises the steps of:
impregnating a porous body with a solution of a soluble chromium compound capable of being converted to chromium oxide on being heated;
drying and curing said impregnated body by heating same to a temperature sufficient to convert the chromium compound in situ to chromium oxide; and,
repeating the impregnation and curing steps at least once to densify, harden and strengthen the body, wherein the body consists of a material which is comprised of materials selected from the group consisting of nitrides, carbides, silicides, borides, intermetallics, stannates, zirconates, titanates, borocarbides, silicates, ferrites, metals, metal alloys, oxides, complex oxides and mixtures thereof; is insoluble in and non-adversely reactive with the solution of a chromium compound selected as an impregnant; and is inherently temperature stable to at least the minimum heat cure temperature employed in converting the chromium compound impregnant, to chromium oxide.

35. The method of claim 34 wherein the bodies are comprised of materials selected from the group consisting of silicon carbide, silicon nitride, cesium stannate, cesium titanate, cesium zirconate, magnesium titanate, magnesium stannate, strontium zirconate, chromium carbide, boron silicide, chromium silicide, titanium boride, vanadium boride, aluminum borocarbide, vanadium carbide, titanium nitride, iron nitride, boron carbide, molybdenum silicide, zirconium silicate, calcium titanite, magnesium stannate and cesium zirconate.

36. The methods of claim 34 wherein the chromium compound is a chromic acid.

37. The method of claim 34 wherein the soluble chromium compound is an acidic chromium compound.

38. The method of claim 37 wherein the chromium compound is a reaction product of chromic acid and an oxide selected from the group consisting of magnesium and zinc oxides.

39. The method of claim 38 wherein the chromium compound is chromic acid having magnesium oxide dissolved therein to provide a specific gravity of about 1.3.

40. The method of claim 39 wherein the magnesium oxide is dissolved in the chromic acid with a ratio of about 40.3 parts by weight to about 100 parts by weight of chromium trioxide.

41. The method of claim 38 wherein the chromium compound is chromic acid having magnesium oxide dissolved therein to provide a specific gravity of about 1.65.

42. The method of claim 41 wherein the magnesium oxide is dissolved in the chromic acid with a ratio of about 40.3 parts by weight to about 200 parts by weight of chromium trioxide to provide a specific gravity of about 1.65.

43. The method of claim 41 wherein the magnesium oxide is dissolved in the chromic acid with a ratio of about 40.3 parts by weight to about 400 parts by weight of chromium trioxide to provide a specific gravity of about 1.65.

44. The method of claim 41 wherein the magnesium oxide is dissolved in the chromic acid with a ratio of about 40.3 parts by weight to about 600 parts by weight of chromium trioxide to provide a specific gravity of about 1.65.

45. The method of claim 41 wherein the magnesium oxide is dissolved in the chromic acid with a ratio of about 40.3 parts by weight to about 1000 parts by weight of chromium trioxide to provide a specific gravity of about 1.65.

46. The method of claim 38 wherein the chromium compound is chromic acid having zinc oxide dissolved therein to provide a specific gravity of about 1.65.

47. The method of claim 46 wherein the zinc oxide is dissolved in the chromic acid with a ratio of about 40.7 parts by weight to about 200 parts by weight of chromium trioxide to provide a specific gravity of about 1.65.

48. The method of claim 46 wherein the zinc oxide is dissolved in the chromic acid with a ratio of about 40.7 parts by weight to about 400 parts by weight of chromium trioxide to provide a specific gravity of about 1.65.

49. The method of claim 46 wherein the zinc oxide is dissolved in the chromic acid with a ratio of about 40.7 parts by weight to about 800 parts by weight of chromium trioxide to provide a specific gravity of about 1.65.

50. The method of claim 46 wherein the zinc oxide is dissolved in the chromic acid with a ratio of about 40.7 parts by weight to about 1000 parts by weight of chromium trioxide to provide a specific gravity of about 1.65.

* * * * *